US012657983B2

(12) United States Patent
Kibihara et al.

(10) Patent No.: US 12,657,983 B2
(45) Date of Patent: Jun. 16, 2026

(54) COIN HANDLING APPARATUS

(71) Applicant: Glory Ltd., Himeji (JP)

(72) Inventors: Fumio Kibihara, Hyogo (JP); Kazuma Sugahara, Hyogo (JP)

(73) Assignee: GLORY LTD., Himeji (JP)

(*) Notice: Subject to any disclaimer, the term of this patent is extended or adjusted under 35 U.S.C. 154(b) by 16 days.

(21) Appl. No.: 18/384,385

(22) Filed: Oct. 27, 2023

(65) Prior Publication Data

US 2024/0062607 A1 Feb. 22, 2024

Related U.S. Application Data

(63) Continuation of application No. 17/206,171, filed on Mar. 19, 2021, now Pat. No. 11,854,330.

(30) Foreign Application Priority Data

Mar. 23, 2020 (JP) ................................ 2020-050821

(51) Int. Cl.

*G07D 1/06* (2006.01)
*G07D 9/00* (2006.01)
*G07G 1/12* (2006.01)

(52) U.S. Cl.

CPC ................. *G07D 1/06* (2013.01); *G07D 9/00* (2013.01); *G07G 1/12* (2013.01); *G07D 2201/00* (2013.01)

(58) Field of Classification Search

CPC ........ G07D 1/06; G07D 9/00; G07D 2201/00; G07D 1/00; G07D 9/008; G07D 3/128; G07G 1/12

See application file for complete search history.

(56) References Cited

U.S. PATENT DOCUMENTS 5,818,019 A * 10/1998 Irwin, Jr. ............. G06K 19/067 235/440
5,997,396 A * 12/1999 Itako ........................ G07D 1/00 453/20

(Continued)

FOREIGN PATENT DOCUMENTS

AU 2011101159 A4 10/2011
JP 2009-277137 A 11/2009

(Continued)

OTHER PUBLICATIONS

Extended European search report issued on Sep. 3, 2021, in corresponding European patent Application No. 21164009.9, 10 pages.

*Primary Examiner* — Thien M Le
*Assistant Examiner* — Asifa Habib
(74) *Attorney, Agent, or Firm* — XSENSUS LLP

(57) ABSTRACT

Provided is a coin handling apparatus including: a storage unit; a drawer attachment unit to which a drawer is attached; a cassette attachment unit to which a coin transport cassette including an opening to be opened when the coin transport cassette is attached to a specific apparatus and giving or receiving a coin to or from the specific apparatus via the opening is attached; a first route forming portion forming a first route that guides the coin fed out of the storage unit to the drawer attached to the drawer attachment unit; a second route forming portion forming a second route that guides the coin fed out of the storage unit to the coin transport cassette attached to the cassette attachment unit; and a switching unit that switches a guide destination of the coin fed out of the storage unit to the first route or the second route.

20 Claims, 25 Drawing Sheets

(56) References Cited

U.S. PATENT DOCUMENTS

| | | | | | |
|---|---|---|---|---|---|
| 6,029,794 | A * | 2/2000 | Tamaki | G07F 17/32 | 453/57 |
| 6,241,069 | B1 * | 6/2001 | Mazur | G07D 7/04 | 194/207 |
| 6,318,537 | B1 * | 11/2001 | Jones | G07D 1/04 | 453/10 |
| 6,386,964 | B1 * | 5/2002 | Thomas | G07F 5/24 | 453/17 |
| 6,637,576 | B1 * | 10/2003 | Jones | G07F 19/20 | 194/216 |
| 7,625,272 | B1 * | 12/2009 | Moreland | G07D 9/008 | 141/358 |
| 11,403,904 | B2 * | 8/2022 | Onishi | G07F 9/06 | |
| 11,423,641 | B2 * | 8/2022 | Ross | G06V 10/225 | |
| 2001/0015310 | A1 * | 8/2001 | Cole | G07D 9/008 | 453/18 |
| 2002/0037696 | A1 * | 3/2002 | Fletcher | G07D 1/00 | 453/1 |
| 2004/0231956 | A1 * | 11/2004 | Adams | G07D 9/00 | 194/217 |
| 2007/0000993 | A1 * | 1/2007 | Graef | G07F 19/20 | 235/379 |
| 2012/0012436 | A1 * | 1/2012 | Nakamoto | G07D 11/50 | 194/215 |
| 2014/0060997 | A1 * | 3/2014 | Doi | G07D 11/24 | 194/206 |
| 2014/0170948 | A1 * | 6/2014 | Enomoto | G07D 3/00 | 453/3 |
| 2014/0263615 | A1 * | 9/2014 | Deangelo | G07D 7/0043 | 235/375 |
| 2015/0213665 | A1 * | 7/2015 | Umeda | G07D 3/128 | 453/57 |
| 2015/0302678 | A1 * | 10/2015 | Blake | G07D 9/06 | 453/62 |
| 2016/0133078 | A1 * | 5/2016 | Hussain | G06K 19/06028 | 235/494 |
| 2016/0350996 | A1 * | 12/2016 | Noh | G07D 7/06 | |
| 2017/0124794 | A1 * | 5/2017 | Katagiri | G07D 9/002 | |
| 2017/0186261 | A1 * | 6/2017 | Haraguchi | G07D 9/00 | |
| 2018/0218554 | A1 * | 8/2018 | Blajwajs | G01N 21/55 | |
| 2019/0073851 | A1 * | 3/2019 | Umeda | G07D 3/14 | |
| 2019/0080542 | A1 * | 3/2019 | Niizuma | G07D 3/16 | |
| 2021/0012604 | A1 * | 1/2021 | Blake | G07D 9/002 | |
| 2021/0201615 | A1 * | 7/2021 | Enomoto | G07D 5/02 | |
| 2021/0304545 | A1 * | 9/2021 | Madani | G07D 7/0057 | |
| 2022/0005305 | A1 * | 1/2022 | Umeda | G07D 9/008 | |
| 2022/0415110 | A1 * | 12/2022 | Horita | G07D 3/14 | |

FOREIGN PATENT DOCUMENTS

| | | | |
|---|---|---|---|
| JP | 4534730 | B2 | 9/2010 |
| JP | 5902667 | B2 | 4/2016 |

* cited by examiner

COIN HANDLING APPARATUS

CROSS-REFERENCE TO RELATED APPLICATIONS

This application is a continuation of U.S. application Ser. No. 17/206,171, filed on Mar. 19, 2021, which claims priority to Japanese Patent Application No. 2020-050821 filed on Mar. 23, 2020, the contents of each are incorporated herein by reference.

TECHNICAL FIELD

The present disclosure relates to a coin handling apparatus.

BACKGROUND

In the related art, as a cash management system installed in a store, there is known a system comprising: a first cash handling apparatus that performs settlement processing by depositing and dispensing cash; and a second cash handling apparatus that dispenses cash that is loaded to the first cash handling apparatus, and that deposits cash collected from the first cash handling apparatus (see, for example, Patent Literature (hereinafter, referred to as "PTL") 1). The first cash handling apparatus is disposed in a register counter in a store, and the second cash handling apparatus is disposed in a back office in the store. The first cash handling apparatus includes a type in which cash is manually deposited or dispensed upon settlement, and a type in which cash is automatically deposited or dispensed upon settlement. In such a cash management system, a drawer or a cash transport cassette is used for cash transport between the first cash handling apparatus and the second cash handling apparatus.

Further, there is known a coin recycling device that stores a coin in a coin change cup and a cash till drawer (see, for example, PTL 2). In a case where only the coin change cup is inserted into the coin recycling device, there becomes a state in which a coin path of a second manifold communicates with a coin path of a third manifold and a coin can be stored in the coin change cup via the coin path of the second manifold and the coin path of the third manifold. When the cash till drawer is inserted into the coin recycling device, the third manifold turns by being pushed by the cash till drawer. By this turning of the third manifold, there becomes a state in which an exit of the coin path of the second manifold faces the cash till drawer and a coin can be stored in the cash till drawer.

CITATION LIST

Patent Literature

PTL 1
Japanese Patent No. 5902667
PTL 2
U.S. Pat. No. 7,625,272

SUMMARY

A coin handling apparatus of the present disclosure includes: a storage unit that stores a coin, and feeds out the coin that has been stored; a drawer attachment unit to which a drawer for a register is attached; a cassette attachment unit to which a coin transport cassette is attached; a first route forming portion forming a first route that guides the coin fed out of the storage unit to the drawer attached to the drawer attachment unit; a second route forming portion forming a second route that guides the coin fed out of the storage unit to the coin transport cassette attached to the cassette attachment unit; and a switching unit that switches a guide destination of the coin fed out of the storage unit to the first route or the second route. The coin transport cassette gives or receives the coin to or from a specific apparatus via an opening that is opened when the coin transport cassette is attached to the specific apparatus.

DETAILED DESCRIPTION

In a technique as in PTL 1, only the drawer or the cash transport cassette can be attached to the second cash handling apparatus. For this reason, in a case where change is prepared for both the drawer and the cash transport cassette, a reduction in time for preparing change may not be achieved since, for example, after change is inserted into the drawer, it is necessary to detach the drawer from the second cash handling apparatus, to attach the cash transport cassette to the second cash handling apparatus, and then to insert change into the cash transport cassette.

Further, in a case where a technique as in PTL 2 is used and change is prepared for both the coin change cup and the cash till drawer, a reduction in time for preparing change may not be achieved since it is necessary, after change is inserted into the coin change cup, to insert the cash till drawer into the coin recycling device and then to insert change into the cash till drawer, for example.

An object of the present disclosure is to provide a coin handling apparatus capable of reducing time for storing a coin in a drawer and a coin transport cassette.

According to the coin handling apparatus of the present disclosure, it is possible to reduce time for storing a coin in the drawer and the coin transport cassette.

Embodiment

Hereinafter, an embodiment of the present disclosure will be described with reference to the accompanying drawings.

<Configuration of Money Handling System>

Figure 1:
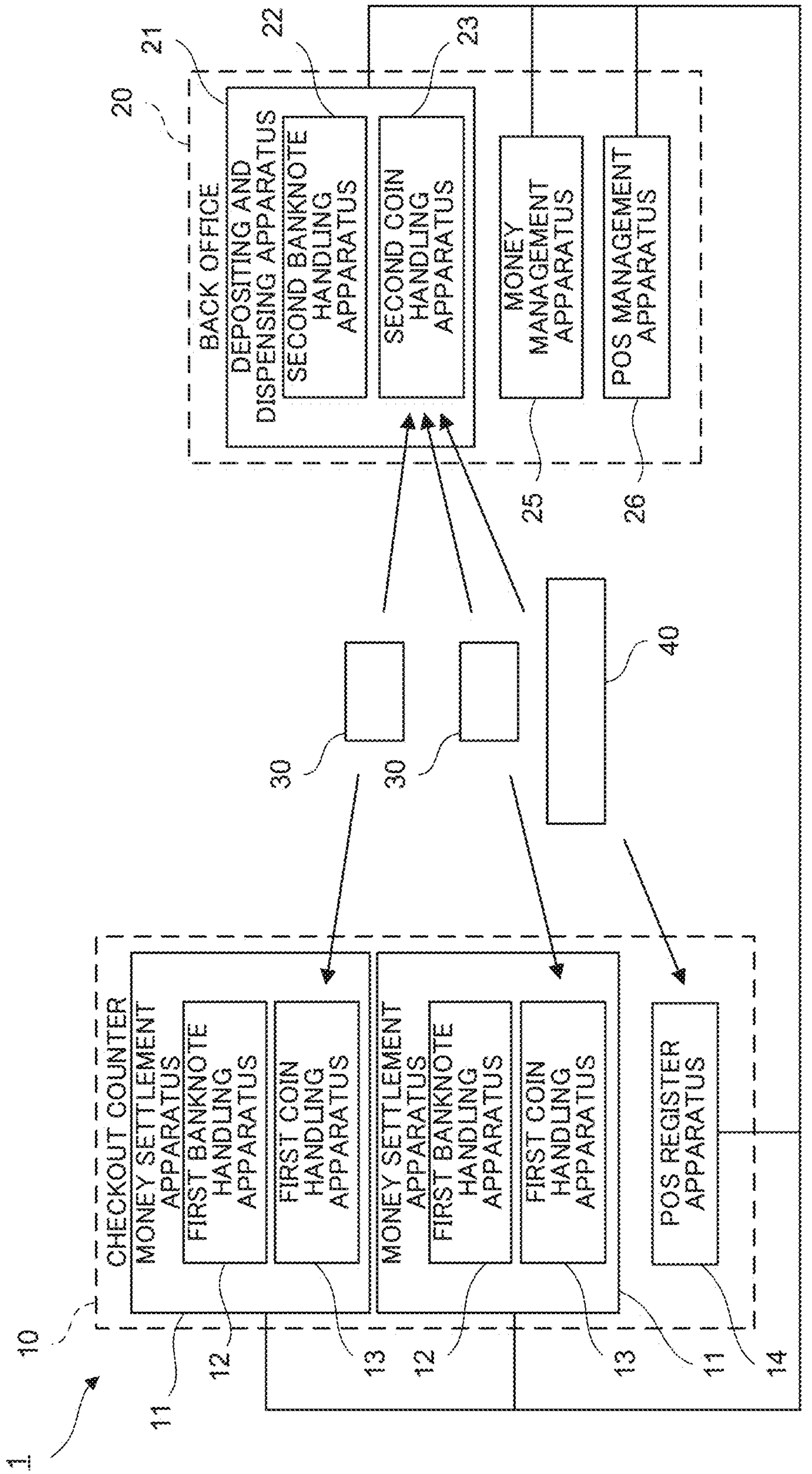
FIG. 1 is a block diagram illustrating a schematic configuration of a money handling system according to an embodiment of the present disclosure.

First, a configuration of a money handling system will be described. In the present embodiment, a front office of a store refers to an area where a money settlement apparatus whereby a customer settles a commercial product is installed. A back office of a store refers to an area where an apparatus that manages banknotes and coins that are handled by a money settlement apparatus is installed. Note that, in the present embodiment, banknotes and coins may be referred to collectively as money. FIG. 1 is a block diagram illustrating a schematic configuration of a money handling system according to an embodiment of the present disclosure.

A money handling system 1 illustrated in FIG. 1 is a system for distribution and is installed in a store. The money handling system 1 comprises two money settlement apparatuses 11, one POS register apparatus 14, a depositing and dispensing apparatus 21, a money management apparatus 25, a POS management apparatus 26, and coin transport cassettes 30. Note that, the money handling system 1 may comprise one or not less than three money settlement apparatuses 11 and/or may comprise not less than two POS register apparatuses 14.

The money settlement apparatuses 11 are installed in a checkout counter 10 that is an example of a front office of a store. The money settlement apparatus 11 is operated by a clerk or a customer himself/herself, and is used in settlement processing between a clerk and a customer. The money settlement apparatus 11 deposits payment paid by a customer or dispenses change that is paid to a customer. The money settlement apparatus 11 is communicably connected to a POS register (not illustrated) that is operated by a clerk or to a self-checkout register (not illustrated) that is operated by a customer. Note that, the money settlement apparatus 11 may be integrally formed with the POS register or the self-checkout register.

Figure 13A:
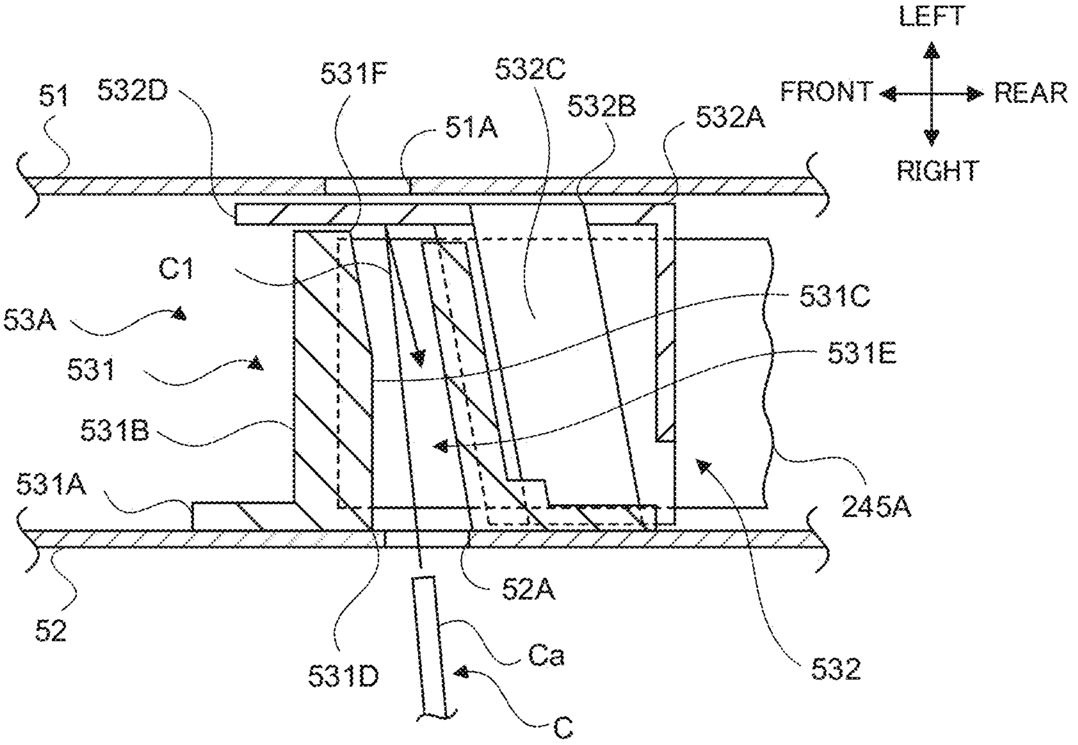
FIG. 13A is a schematic diagram illustrating a state of a switching mechanism when a coin is guided to the drawer according to the embodiment of the present disclosure.

The money settlement apparatus 11 comprises: a first banknote handling apparatus 12 that handles a banknote; and a first coin handling apparatus 13 that handles a coin C (see FIG. 13A). Details of the first coin handling apparatus 13 will be described later. Note that, at least one of the two money settlement apparatuses 11 may be an apparatus that performs only depositing and dispensing processing of the coin C.

The POS register apparatus 14 is installed in the checkout counter 10. A clerk manually deposits or dispenses money to or from a drawer 40, thereby settlement processing of the POS register apparatus 14 is performed.

The depositing and dispensing apparatus 21, the money management apparatus 25, and the POS management apparatus 26 are installed in a back office 20 of the store. The depositing and dispensing apparatus 21 is communicably connected to each of the money settlement apparatuses 11 and to the POS register apparatus 14. The depositing and dispensing apparatus 21 dispenses a change fund for being loaded to the money settlement apparatus 11 and the POS register apparatus 14, or deposits proceeds from sales collected from the money settlement apparatus 11 and the POS register apparatus 14. The depositing and dispensing apparatus 21 comprises: a second banknote handling apparatus 22 that handles a banknote; and a second coin handling apparatus 23 that handles the coin C. Details of the second coin handling apparatus 23 will be described later.

The money management apparatus 25 is communicably connected to each of the money settlement apparatuses 11, to the POS register apparatus 14, and to the depositing and dispensing apparatus 21 via a local area network (LAN) or the like. The money management apparatus 25 manages money stored in each of the money settlement apparatuses 11, in the POS register apparatus 14, and in the depositing and dispensing apparatus 21. For example, the money management apparatus 25 manages money subjected to settlement processing in each of the money settlement apparatuses 11 and in the POS register apparatus 14, respectively, and manages money given or received between the money settlement apparatus 11 and the depositing and dispensing apparatus 21, and money given or received between the POS register apparatus 14 and the depositing and dispensing apparatus 21. Further, the money management apparatus 25 may monitor whether the coin transport cassette 30 is attached to the money settlement apparatus 11 or the depositing and dispensing apparatus 21. The money management apparatus 25 may monitor whether the drawer 40 is attached to the POS register apparatus 14 or the depositing and dispensing apparatus 21. The POS management apparatus 26 manages a flow of a commercial product. Note that, at least two of the POS register apparatus 14, the money management apparatus 25, and the POS management apparatus 26 may be integrally formed.

The coin transport cassette 30 is configured to be attachable to and detachable from the first coin handling apparatus 13 of the money settlement apparatus 11, and to be attachable to and detachable from the second coin handling apparatus 23 of the depositing and dispensing apparatus 21. When the coin transport cassette 30 is attached to the first coin handling apparatus 13, the coin transport cassette 30 is configured to be capable of giving or receiving the coin C between the coin transport cassette 30 and the first coin handling apparatus 13. When the coin transport cassette 30 is attached to the second coin handling apparatus 23, the coin transport cassette 30 is configured to be capable of giving or receiving the coin C between the coin transport cassette 30 and the second coin handling apparatus 23. The first coin handling apparatus 13 and the second coin handling apparatus 23 are examples of a specific apparatus. On the other hand, the coin transport cassette 30 is configured such that the coin C therein cannot be taken out when the coin transport cassette 30 is detached from the first coin handling apparatus 13 or the second coin handling apparatus 23. A clerk uses the coin transport cassette 30 to transport the coin C between the first coin handling apparatus 13 and the second coin handling apparatus 23. For example, when a change fund is loaded or when proceeds from sales are collected, a clerk uses the coin transport cassette 30 to transport the coin C between the first coin handling apparatus 13 and the second coin handling apparatus 23. The clerk cannot touch the coin C in the coin transport cassette 30 when transporting the coin C. For this reason, the coin C can be transported in a safe state in terms of security. Note that, it may also be configured such that only a person having the authority, such as a manager of a store, is allowed to open the coin transport cassette 30.

The drawer 40 is configured to be attachable to and detachable from the POS register apparatus 14, and to be attachable to and detachable from the second coin handling apparatus 23 of the depositing and dispensing apparatus 21. For example, when a change fund is loaded or when proceeds from sales are collected, a clerk uses the drawer 40 to transport the coin C between the POS register apparatus 14 and the second coin handling apparatus 23.

<Configuration of Coin Transport Cassette>

Figure 2A:
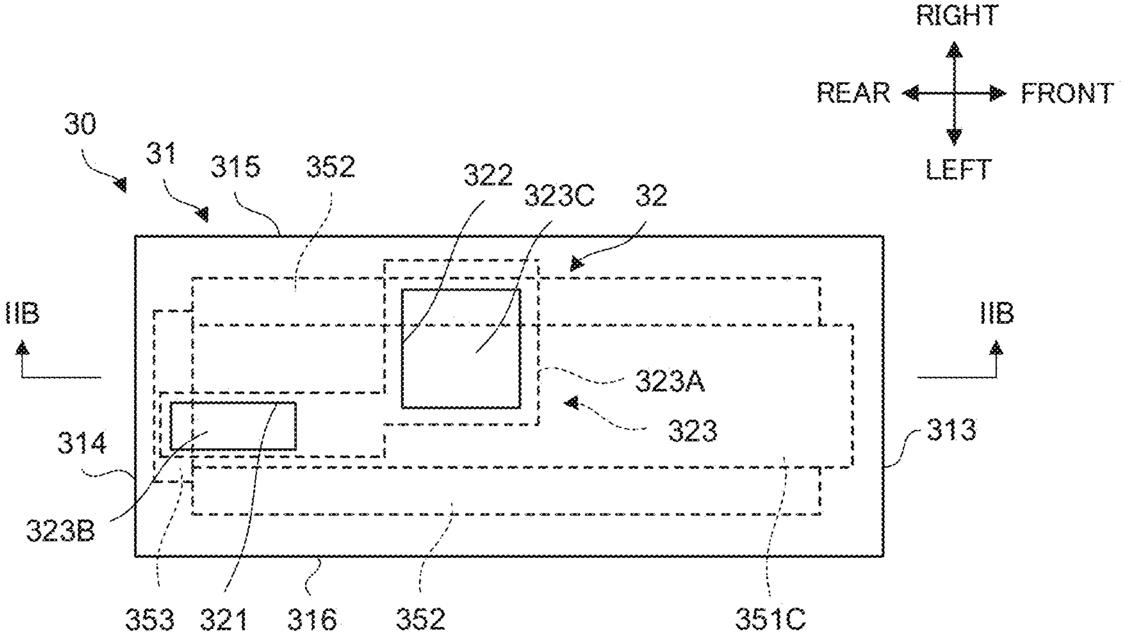
FIG. 2A is a top view illustrating a schematic configuration of a coin transport cassette according to the embodiment of the present disclosure.
Figure 2B:
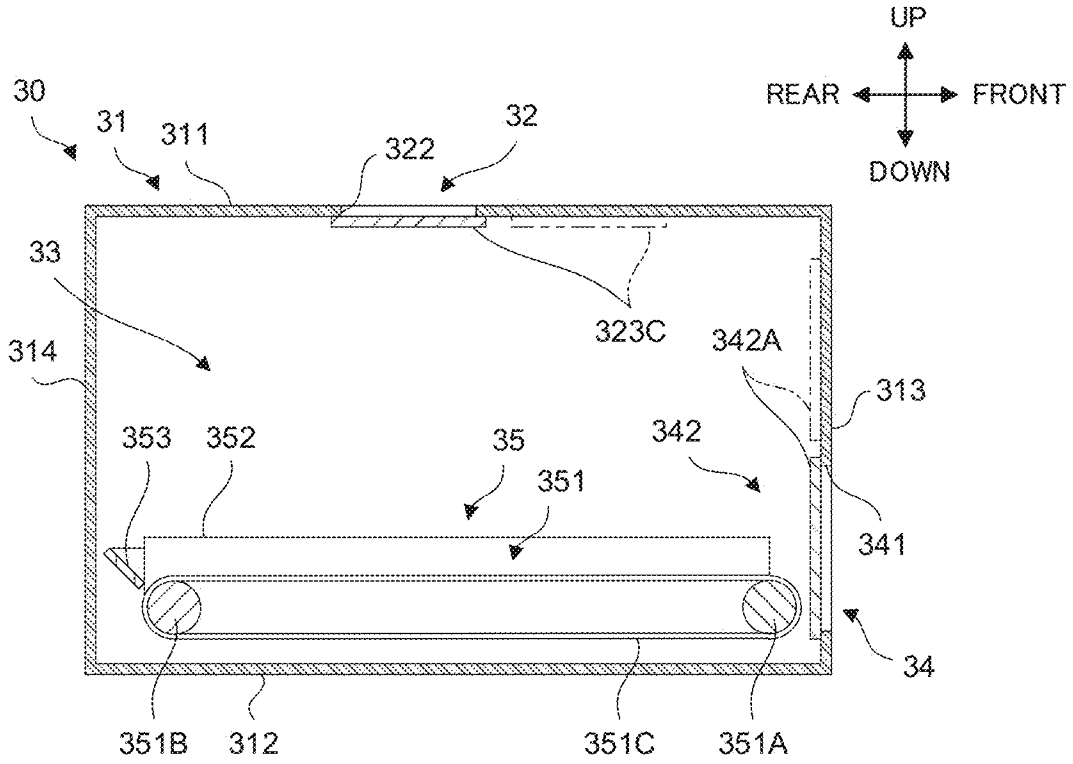
FIG. 2B is a cross-sectional view taken along IIB-IIB of FIG. 2A according to the embodiment of the present disclosure.
Figure 3:
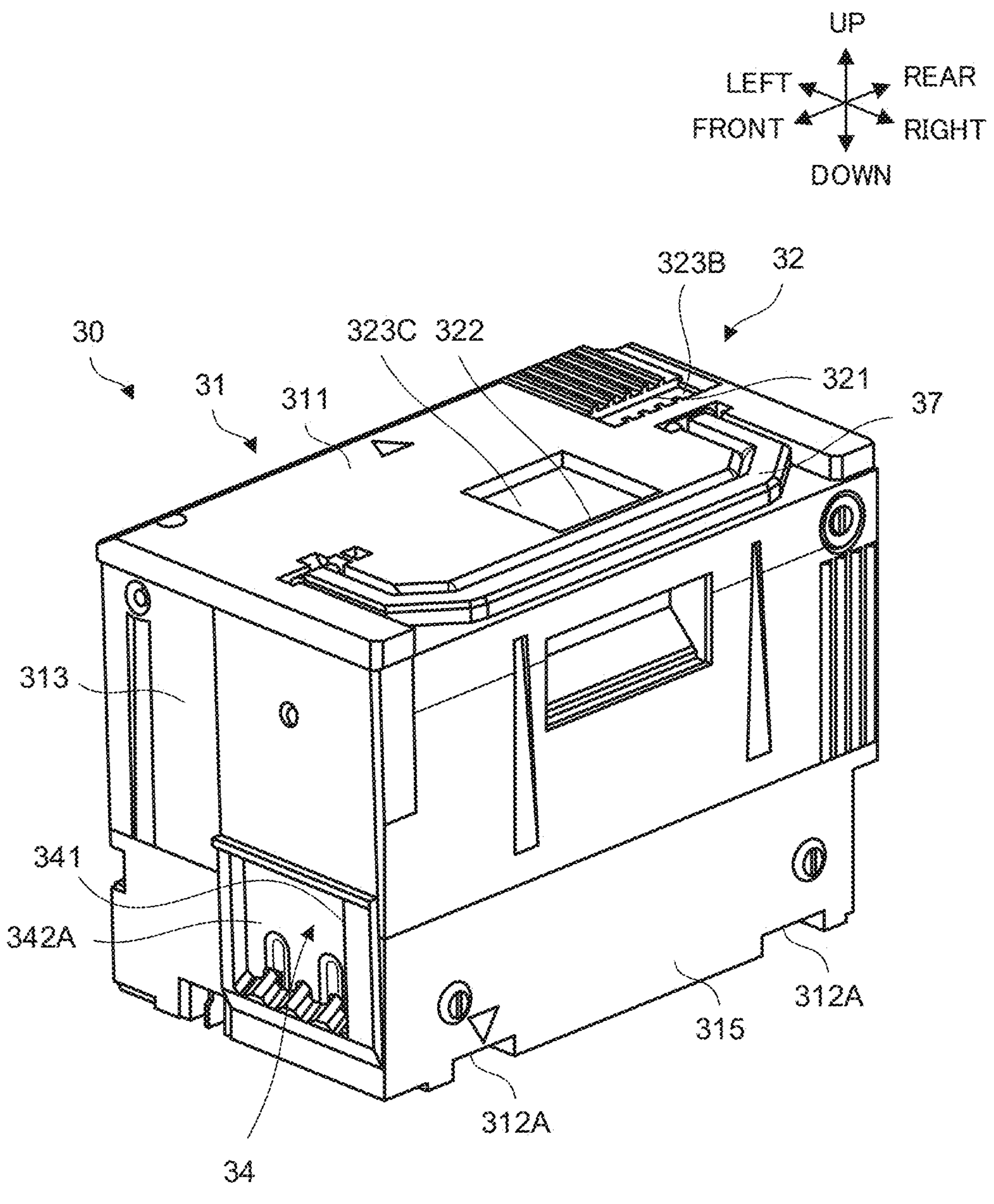
FIG. 3 is a perspective view of an external appearance of the coin transport cassette according to the embodiment of the present disclosure.
Figure 4:
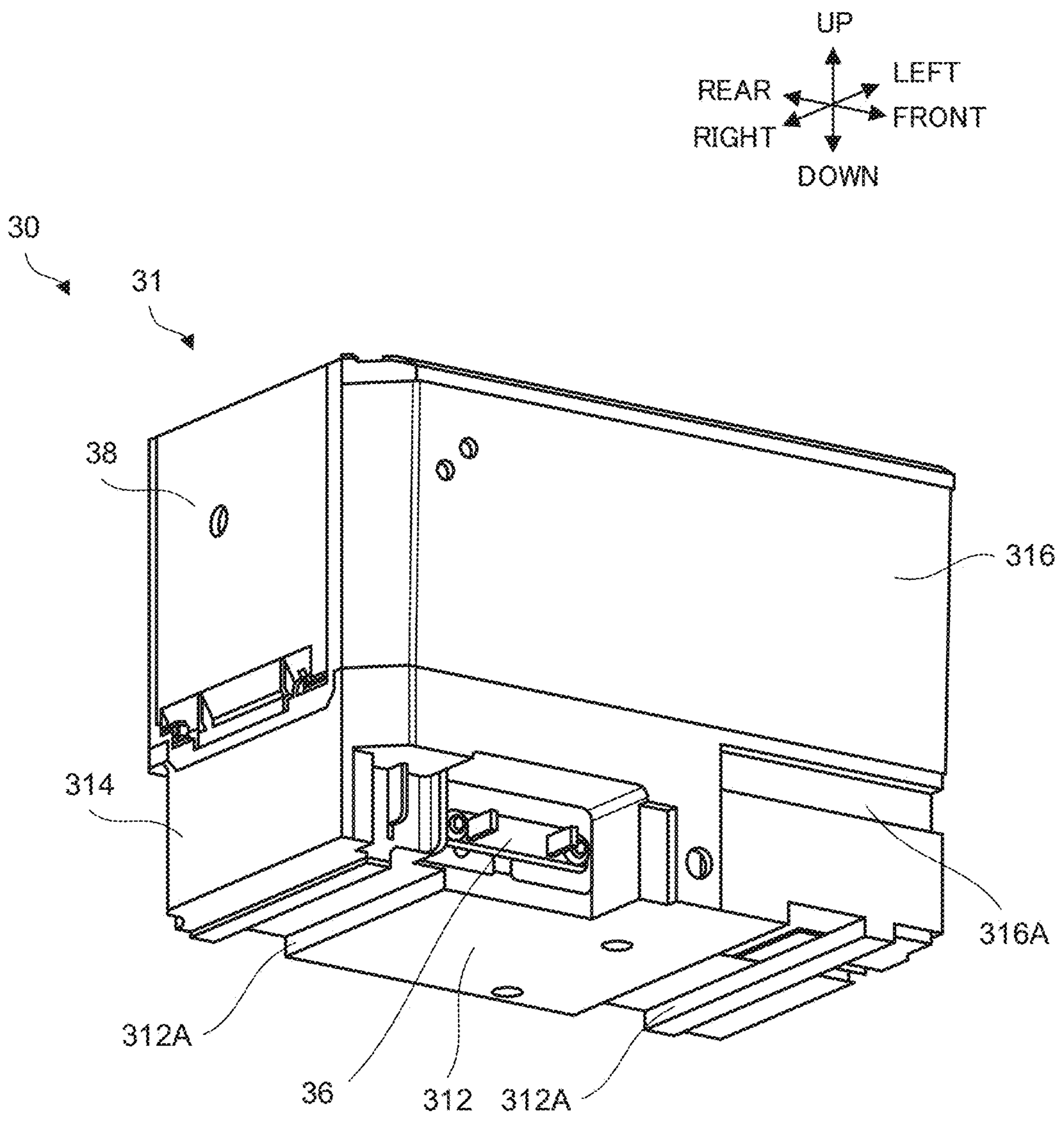
FIG. 4 is a perspective view of the external appearance of the coin transport cassette according to the embodiment of the present disclosure when viewed from an angle different from that in FIG. 3.

Next, a configuration of the coin transport cassette 30 will be described. FIG. 2A is a top view illustrating a schematic configuration of the coin transport cassette. FIG. 2B is a cross-sectional view taken along IIB-IIB of FIG. 2A. FIG. 3 is a perspective view of an external appearance of the coin transport cassette. FIG. 4 is a perspective view of the external appearance of the coin transport cassette when viewed from an angle different from that in FIG. 3. Note that, the arrangement of each configuration of the coin transport cassette 30 or the like may be described using the directions indicated in FIG. 2A, FIG. 2B, FIG. 3 and FIG. 4.

As illustrated in FIG. 2A, FIG. 2B, FIG. 3 and FIG. 4, the coin transport cassette 30 comprises a housing 31, a reception unit 32, a storage unit 33, a discharge unit 34, a feeding unit 35, a connector 36, a holding portion 37, and an opening and closing door 38.

The housing 31 comprises an upper surface portion 311, a bottom surface portion 312, a front surface portion 313, a rear surface portion 314, a right surface portion 315, and a left surface portion 316. As illustrated in FIG. 3 and FIG. 4, the bottom surface portion 312 is provided with first guide grooves 312A extending rightward and leftward. The first guide grooves 312A are provided in a front portion and a rear portion of the bottom surface portion 312, respectively. The first guide grooves 312A are configured such that, when the coin transport cassette 30 is attached to the first coin handling apparatus 13, the coin transport cassette 30 is guided in a state in which the left surface portion 316 is located at the front in the attachment direction by fitting guide rails (not illustrated) provided on the first coin handling apparatus 13 into the first guide grooves 312A. As illustrated in FIG. 4, a second guide groove 316A extending frontward and rearward is provided in a front portion of the left surface portion 316. The second guide groove 316A is configured such that, when the coin transport cassette 30 is attached to the second coin handling apparatus 23, the coin transport cassette 30 is guided in a state in which the front surface portion 313 is located at the front in the attachment direction by fitting a guide rail 232A (see FIG. 8A) provided on the second coin handling apparatus 23 into the second guide groove 316A. That is, the coin transport cassette 30 is configured such that the attachment direction when the coin transport cassette 30 is attached to the first coin handling apparatus 13 differs by 90° from the attachment direction when the coin transport cassette 30 is attached to the second coin handling apparatus 23. Note that, the angle formed by the direction when the coin transport cassette 30 is attached to the first coin handling apparatus 13 and the direction when the coin transport cassette 30 is attached to the second coin handling apparatus 23 may not be 90° and may be 0° (the orientation when the coin transport cassette 30 is attached to the first coin handling apparatus 13 and the orientation when the coin transport cassette 30 is attached to the second coin handling apparatus 23 are the same).

The reception unit 32 receives the coin C from the first coin handling apparatus 13 or the second coin handling apparatus 23. As illustrated in FIG. 2A, FIG. 2B and FIG. 3, the reception unit 32 comprises a first reception port 321, a second reception port 322, and a reception port opening and closing unit 323.

The first reception port 321 is provided in a rear portion of the upper surface portion 311. The first reception port 321 is formed in a rectangle whose long side direction is parallel to the front-rear direction of the housing 31. The first reception port 321 is configured to be capable of receiving the coin C from the first coin handling apparatus 13. Note that, the shape of the first reception port 321 is not limited to a rectangle, and may also be any other shape.

The second reception port 322 is provided near the center of the upper surface portion 311. The second reception port 322 is formed in a quadrangle whose sides orthogonal to each other have a substantially equal length. The second reception port 322 has an opening area larger than the opening area of the first reception port 321. The second reception port 322 is configured to be capable of receiving the coin C from the second coin handling apparatus 23. Note that, the shape of the second reception port 322 is not limited to a quadrangle, and may also be any other shape.

The reception port opening and closing unit 323 opens and closes the first reception port 321 and the second reception port 322. The reception port opening and closing unit 323 comprises a reception port blocking member 323A and a reception port opening and closing driving unit (not illustrated). The reception port blocking member 323A is formed in a plate shape. A part of the reception port blocking member 323A forms a first blocking unit 323B that blocks the first reception port 321. Another part of the reception port blocking member 323A forms a second blocking unit 323C that blocks the second reception port 322. The reception port opening and closing driving unit comprises an opening and closing motor, and an opening and closing mechanism. The opening and closing motor is driven by control of the first coin handling apparatus 13 or the second coin handling apparatus 23. The opening and closing mechanism moves the reception port blocking member 323A frontward and rearward. The opening and closing mechanism is controlled by the driving of the opening and closing motor to move the reception port blocking member 323A frontward and rearward, whereby both the first reception port 321 and the second reception port 322 can be opened or closed simultaneously. Note that, the first reception port 321 and the second reception port 322 may be opened or closed individually.

As illustrated in FIG. 2B, the storage unit 33 is an inner space of the housing 31. The storage unit 33 stores the coin C received at the reception unit 32.

The discharge unit 34 discharges the coin C stored in the storage unit 33. As illustrated in FIG. 2B and FIG. 3, the discharge unit 34 comprises a discharge port 341, and a discharge port opening and closing unit 342.

The discharge port 341 is an example of an opening, and is provided in a lower portion of the front surface portion 313.

The discharge port opening and closing unit 342 opens and closes the discharge port 341. The discharge port opening and closing unit 342 comprises a discharge port blocking member 342A, an opening and closing motor (not illustrated), and an opening and closing mechanism (not illustrated). The discharge port blocking member 342A is formed in a plate shape. The opening and closing motor is driven by control of the first coin handling apparatus 13 or the second coin handling apparatus 23. The opening and closing mechanism moves the discharge port blocking member 342A upward and downward. The opening and closing mechanism is controlled by the driving of the opening and closing motor to move the discharge port blocking member 342A upward and downward, whereby the discharge port 341 can be opened and closed.

The feeding unit 35 feeds out the coin C stored in the storage unit 33 such that the coin C is discharged from the discharge unit 34. As illustrated in FIG. 2A and FIG. 2B, the feeding unit 35 comprises a transport mechanism 351, side wall portions 352, and a rear wall portion 353.

The transport mechanism 351 is an example of a cassette transport unit that transports the coin C in a horizontal direction. Note that, the horizontal direction mentioned here does not mean the horizontal direction in a strict sense, but means a state in which a horizontal-direction component of the transport direction is larger than a vertical-direction component thereof. However, the transport direction may also be the horizontal direction in a strict sense. The transport mechanism 351 comprises a transport motor (not illustrated), a driving pulley 351A, a driven pulley 351B, and a transport belt 351C. The transport motor is driven by control of the first coin handling apparatus 13 or the second coin handling apparatus 23. In a front and lower portion of the coin transport cassette 30, the driving pulley 351A is provided on a rotating shaft of the transport motor so as to extend rightward and leftward. In a rear and lower portion of the coin transport cassette 30, the driven pulley 351B is supported by a bearing (not illustrated) so as to extend rightward and leftward. The transport belt 351C is wound around the driving pulley 351A and the driven pulley 351B. The coin C received through the reception unit 32 is placed on the transport belt 351C. That is, the transport belt 351C forms a bottom portion of the storage unit 33.

The side wall portions 352 are provided on both sides of the transport belt 351C in the width direction, respectively. The side wall portions 352 are inclined so as to gradually approach each other downward such that the coin C that has fallen from the reception unit 32 can be guided onto the transport belt 351C.

The rear wall portion 353 is provided rearward from the transport belt 351C. The rear wall portion 353 is inclined so as to gradually approach the rear surface portion 314 upward such that the coin C that has fallen from the reception unit 32 can be guided onto the transport belt 351C.

As illustrated in FIG. 4, the connector 36 is provided so as to be exposed to the outside from a rear and lower portion of the left surface portion 316 of the housing 31. The connector 36 is connected to a connector (not illustrated) of the first coin handling apparatus 13 when the coin transport cassette 30 is attached to the first coin handling apparatus 13. The connector 36 is connected to a connector (not illustrated) of the second coin handling apparatus 23 when the coin transport cassette 30 is attached to the second coin handling apparatus 23. When the connector 36 is connected to the connector of the first coin handling apparatus 13 or the second coin handling apparatus 23, power is supplied to the opening and closing motor of the reception port opening and closing unit 323, the opening and closing motor and the transport motor of the discharge unit 34, and/or the like via the connector 36 such that the opening and closing motor of the reception port opening and closing unit 323, the opening and closing motor and the transport motor of the discharge unit 34, and/or the like operate. When the connector 36 is connected to the connector of the first coin handling apparatus 13 or the second coin handling apparatus 23, the coin transport cassette 30 can be controlled by the first coin handling apparatus 13 or the second coin handling apparatus 23 via the connector 36.

The holding portion 37 is configured such that a clerk can hold the coin transport cassette 30 when the clerk transports the coin transport cassette 30.

The opening and closing door 38 is configured such that by opening the opening and closing door 38, a clerk can manually feed the coin C into the storage unit 33, perform maintenance of a configuration disposed inside the housing 31, or the like.

<Configuration of First Coin Handling Apparatus of Money Settlement Apparatus>

Figure 5:
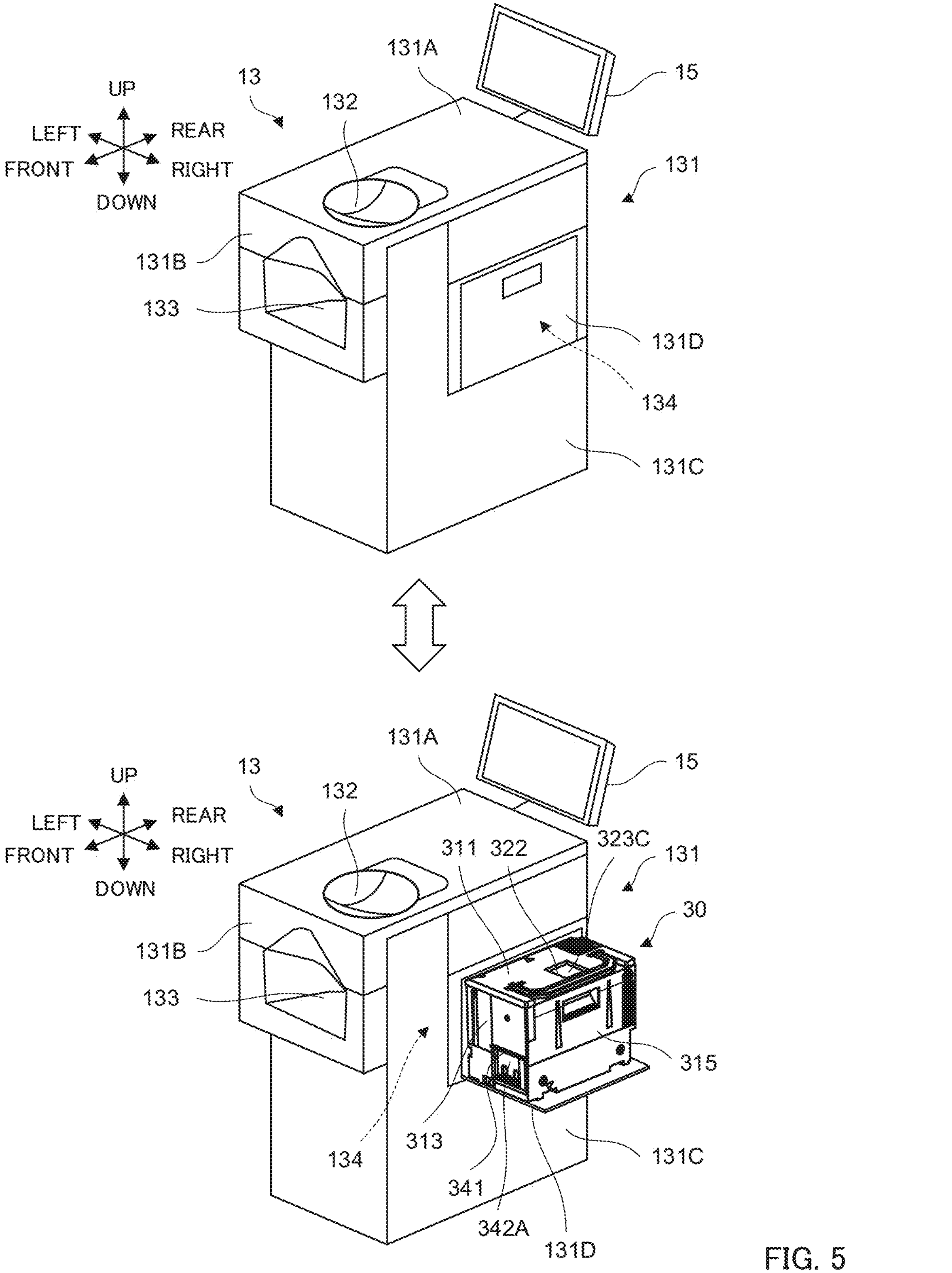
FIG. 5 is a perspective view of an external appearance of a first coin handling apparatus according to the embodiment of the present disclosure.
Figure 6:
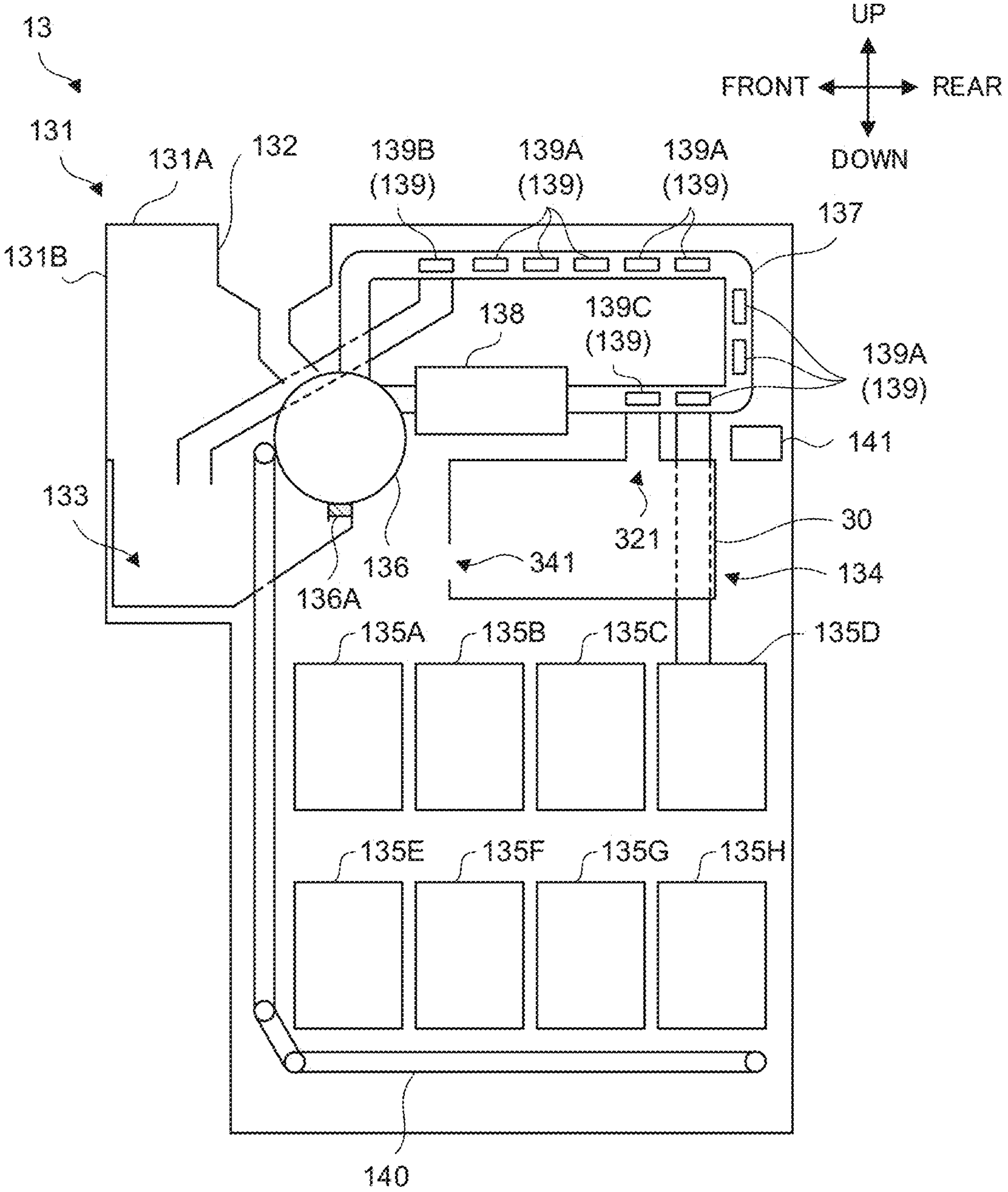
FIG. 6 is a schematic diagram illustrating an internal configuration of the first coin handling apparatus according to the embodiment of the present disclosure.

Next, a configuration of the first coin handling apparatus 13 will be described. FIG. 5 is a perspective view of an external appearance of the first coin handling apparatus. FIG. 6 is a schematic diagram illustrating an internal configuration of the first coin handling apparatus. Note that, the arrangement of each configuration of the first coin handling apparatus 13 or the like may be described using the directions indicated in FIG. 5 and FIG. 6.

First, the configuration of the first coin handling apparatus 13 visible from the outside will be described. As illustrated in FIG. 5, the first coin handling apparatus 13 comprises a housing 131, a depositing unit 132, a dispensing unit 133, and a cassette attachment unit 134.

The depositing unit 132 is provided in a front portion of an upper surface portion 131A of the housing 131. That is, the depositing unit 132 is provided on a side on which a customer stands when operating the first coin handling apparatus 13. The depositing unit 132 is configured such that the coin C can be deposited into the first coin handling apparatus 13.

The dispensing unit 133 is provided in a lower portion of a front surface portion 131B of the housing 131. The dispensing unit 133 is configured such that the coin C can be dispensed from the first coin handling apparatus 13.

As illustrated in a diagram on an upper side of FIG. 5, the cassette attachment unit 134 is provided in a rear portion of a right surface portion 131C of the housing 131. The cassette attachment unit 134 is hidden by a cover 131D when the coin transport cassette 30 is not attached to the cassette attachment unit 134, and is exposed when the cover 131D is opened. As illustrated in a diagram on a lower side of FIG. 5, a clerk attaches the coin transport cassette 30 to the cassette attachment unit 134 by pushing the coin transport cassette 30 into the interior of the housing 131 such that the front surface portion 313 of the coin transport cassette 30 faces frontward and the left surface portion 316 faces the right surface portion 131C of the housing 131. By this attachment, the connector 36 of the coin transport cassette 30 is connected to a connector (not illustrated) of the cassette attachment unit 134. Further, the cassette attachment unit 134 is provided with guide rails (not illustrated) extending rightward and leftward. A clerk can easily perform the attachment operation by fitting the guide rails into the first guide grooves 312A of the coin transport cassette 30 and sliding the coin transport cassette 30.

An operation display 15 is connected to the first coin handling apparatus 13. The operation display 15 is formed of a touch screen-type liquid crystal display apparatus, and functions as an operation unit for inputting information on money handling in the first banknote handling apparatus 12 and the first coin handling apparatus 13, and as a display that displays information on money handling. Note that, the operation display 15 may be formed separately from the money settlement apparatus 11 or may be integrally formed with the money settlement apparatus 11. The operation display 15 may also be configured such that the operation unit and the display are provided independently of each other.

Next, an internal configuration of the first coin handling apparatus 13 will be described. As illustrated in FIG. 6, the first coin handling apparatus 13 further comprises storage units 135A, 135B, 135C, 135D, 135E, 135F, 135G, and 135H (which may be referred to hereinafter as "storage units 135A to 135H"), a feeding unit 136, a depositing transport unit 137, a recognition unit 138, a plurality of chutes 139, a dispensing transport unit 140, and a control unit 141.

The storage units 135A to 135H are configured so as to be capable of storing the coin C and feeding out the coin C that has been stored. As a mechanism to feed out the coin C in the storage units 135A to 135H, it is possible to exemplify a mechanism in which a rotary disk rotating in an inclined state is used and the coin C is picked up one by one by a plurality of projection members on an outer area of a surface of the rotary disk and is fed out. Denominations that are stored in each of the storage units 135A to 135H are set in advance.

The feeding unit 136 is configured to be capable of receiving the coin C deposited through the depositing unit 132, feeding out the coin C one by one, and causing the coin C to fall into the dispensing unit 133. As a mechanism to feed out the coin C in the feeding unit 136, it is possible to exemplify a mechanism similar to that of the storage units 135A to 135H.

The depositing transport unit 137 transports the coin C fed out of the feeding unit 136.

The recognition unit 138 is provided in the depositing transport unit 137, recognizes denomination, authenticity, fitness, and/or the like of the coin C deposited through the depositing unit 132, and counts the coin C.

The plurality of chutes 139 is provided downstream of the recognition unit 138 in the depositing transport unit 137 in the transport direction of the coin C. The plurality of chutes 139 is provided side by side in a row in the transport direction of the coin C. Of the plurality of chutes 139, eight chutes 139A are configured to be capable of guiding the coin C to any one of the storage units 135A to 135H. One chute 139B is configured to be capable of guiding the coin C to the dispensing unit 133. One chute 139C that is the remaining chute is configured to be capable of guiding the coin C to the coin transport cassette 30. The chutes 139 are normally closed by gates (not illustrated), and guides the coin C to each portion described above by opening the gates. Note that, the number of the chutes 139A may be the same as the number of storage units, and may not be eight.

The dispensing transport unit 140 is provided downward from the feeding unit 136. The dispensing transport unit 140 transports the coin C fed out of the storage units 135A to 135H to the feeding unit 136. The dispensing transport unit 140 transports the coin C, which has been discharged from the coin transport cassette 30 and has fallen, to the feeding unit 136.

The control unit 141 controls entire operation of the first coin handling apparatus 13. The control unit 141 causes depositing processing of the coin C paid by a customer to be performed upon settlement of a commercial product. When the depositing processing is performed, for example, the control unit 141 controls the feeding unit 136 and the depositing transport unit 137 such that the coin C, which has been received through the depositing unit 132 and has fallen into the feeding unit 136, is fed out one by one and is transported. A coin that is transported is subjected to recognition of denomination, authenticity, fitness, and/or the like by the recognition unit 138. The control unit 141 controls the depositing transport unit 137 and the chutes 139 based on a recognition result by the recognition unit 138 such that the coin C which cannot be deposited is discharged as a rejected coin from the dispensing unit 133. The control unit 141 controls the depositing transport unit 137 and the gates such that the coin C which can be deposited is stored in the storage units 135A to 135H for each denomination.

The control unit 141 causes dispensing processing of the coin C to be performed in a case where there is change upon settlement of a commercial product. When the dispensing processing is performed, for example, the control unit 141 controls the storage units 135A to 135H storing the coin C to be dispensed and the dispensing transport unit 140 such that the coin C, which has been fed out of the storage units 135A to 135H and has fallen, is transported to the feeding unit 136. The control unit 141 controls the feeding unit 136 such that a bottom portion 136A of the feeding unit 136 is opened, thereby discharging the coin C into the dispensing unit 133. Note that, the control unit 141 may also cause the coin C, which has been transported to the feeding unit 136, to be fed out into the depositing transport unit 137 and to pass through the recognition unit 138, and then control the gate of the chute 139B, thereby causing the coin C to be discharged into the dispensing unit 133.

The control unit 141 causes the storage units 135A to 135H to be replenished with the coin C stored in the coin transport cassette 30 before a store opens, for example. The control unit 141 causes the coin C stored in the storage units 135A to 135H to be collected to the coin transport cassette 30 after a store closes, for example. Such replenishment processing and collection processing of the coin C will be described later.

<Configuration of Second Coin Handling Apparatus of Depositing and Dispensing Apparatus>

Figure 7:
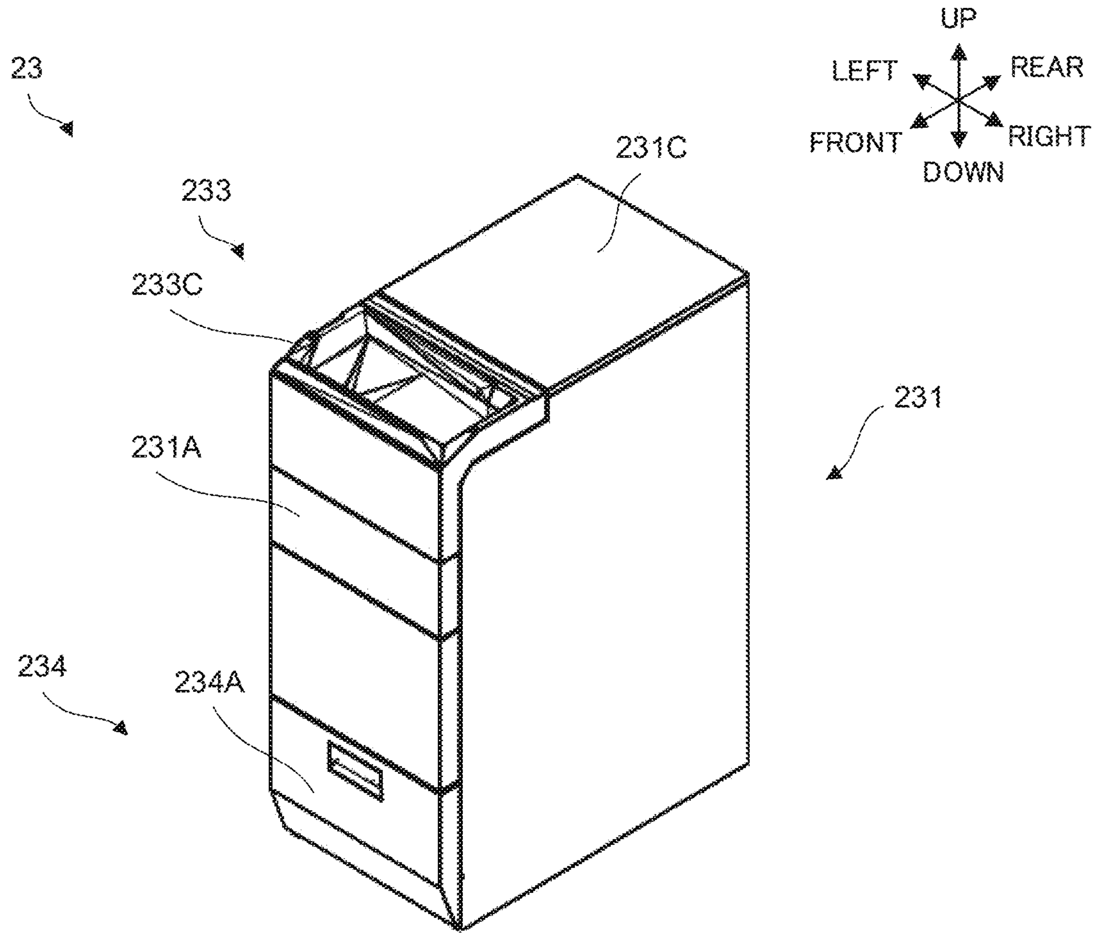
FIG. 7 is a perspective view of an external appearance of a second coin handling apparatus according to the embodiment of the present disclosure.
Figure 8A:
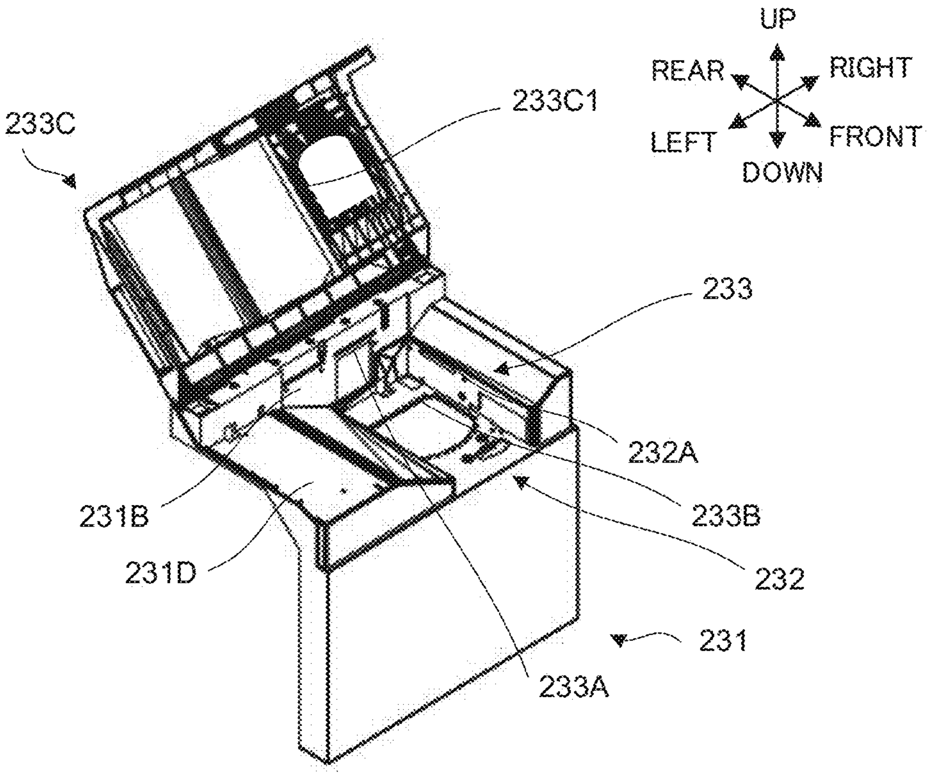
FIG. 8A is a perspective view illustrating a state in which a cover of the second coin handling apparatus is opened according to the embodiment of the present disclosure.
Figure 8B:
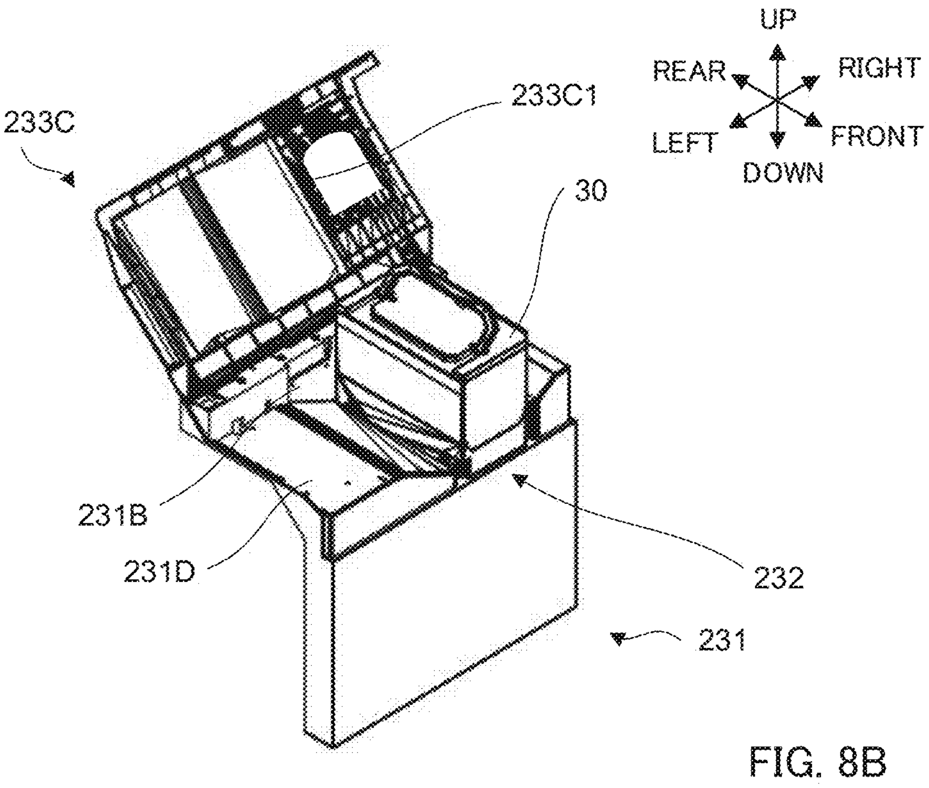
FIG. 8B is a perspective view illustrating a state in which the coin transport cassette is attached to the second coin handling apparatus according to the embodiment of the present disclosure.
Figure 9A:
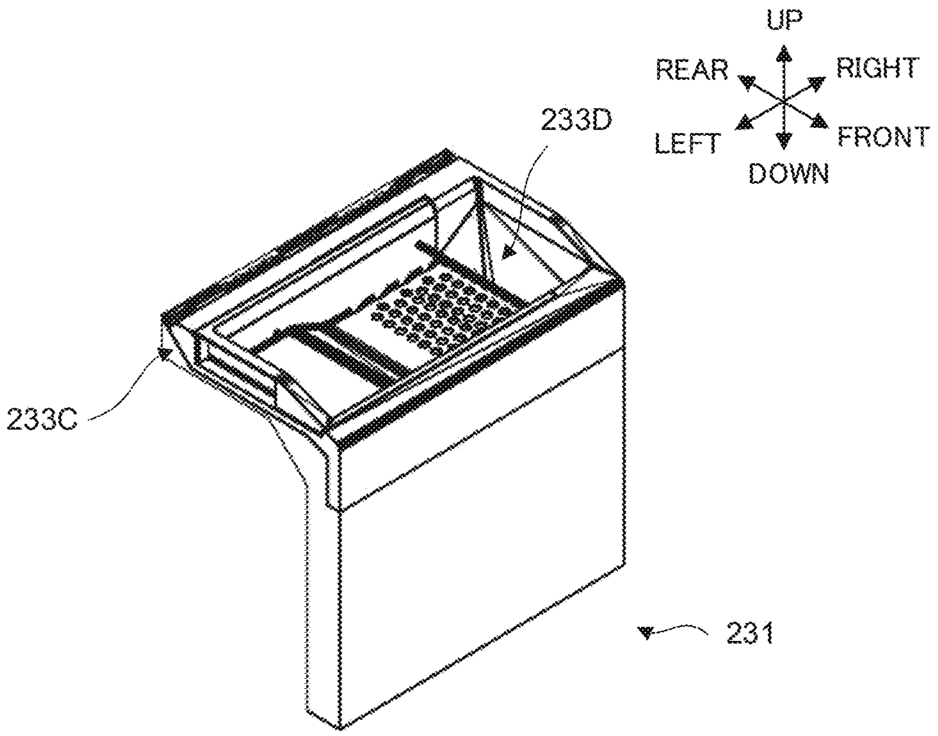
FIG. 9A is a perspective view illustrating a state in which a tray covers an exposure port of the cover according to the embodiment of the present disclosure.
Figure 9B:
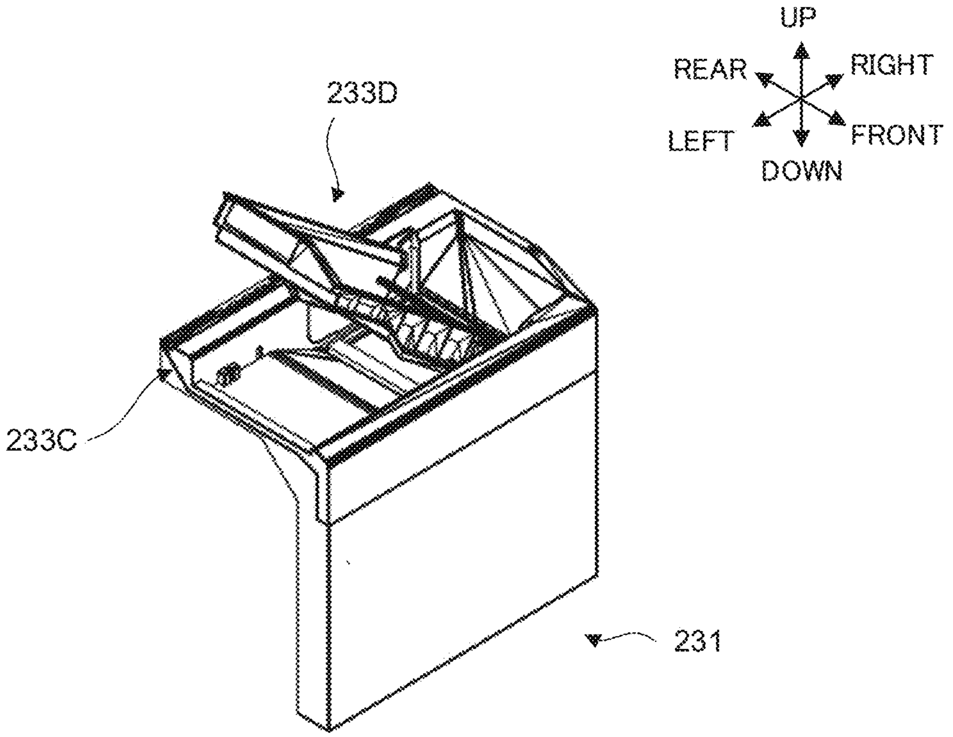
FIG. 9B is a perspective view illustrating a state in which the tray does not cover the exposure port of the cover according to the embodiment of the present disclosure.
Figure 10A:
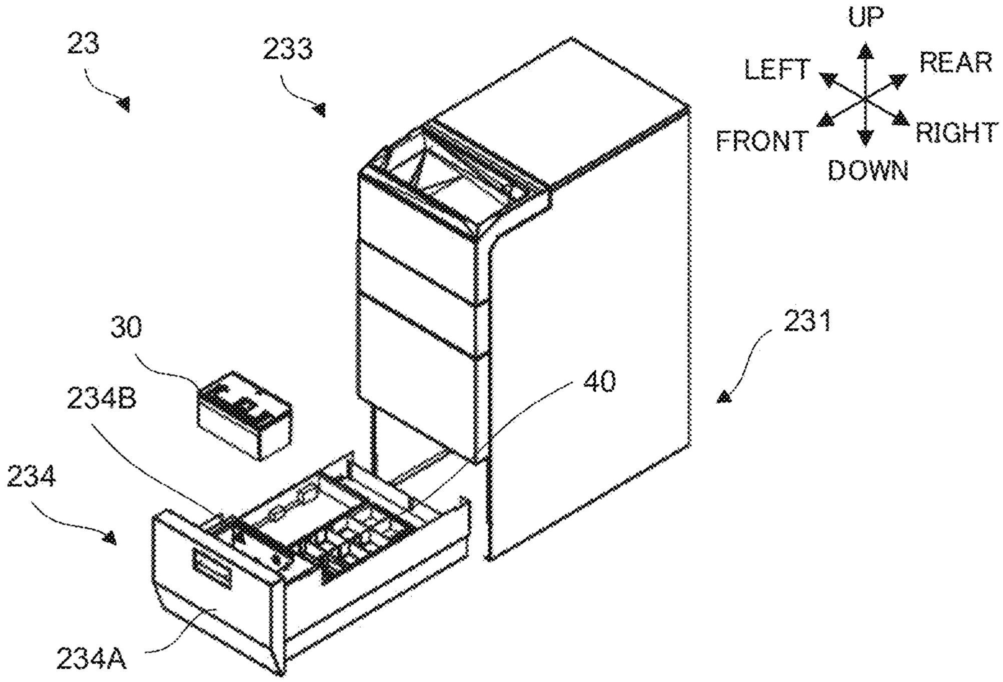
FIG. 10A is a perspective view illustrating how the coin transport cassette is attached to the second coin handling apparatus according to the embodiment of the present disclosure.
Figure 10B:
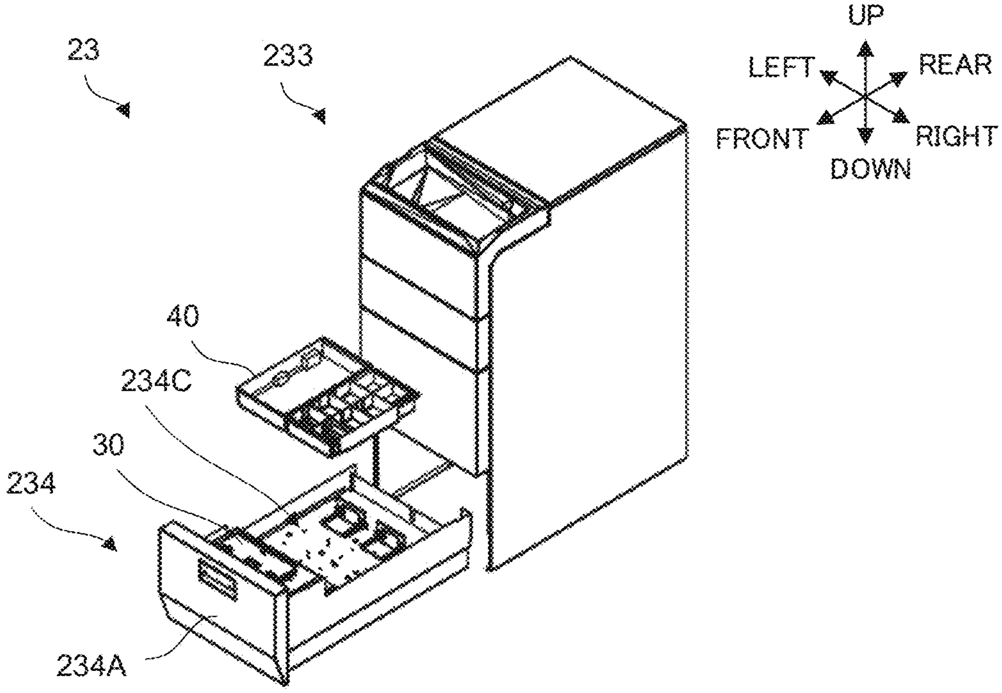
FIG. 10B is a perspective view illustrating how a drawer is attached to the second coin handling apparatus according to the embodiment of the present disclosure.
Figure 11A:
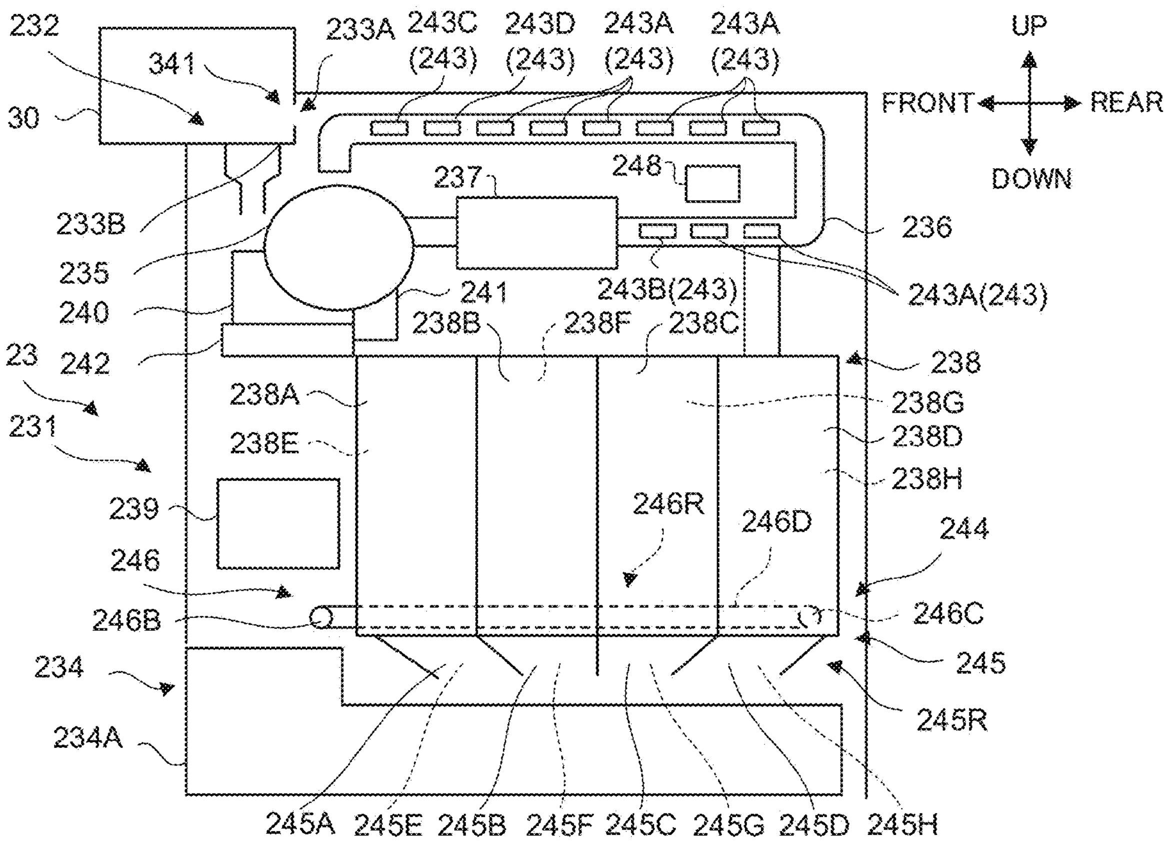
FIG. 11A is a schematic diagram illustrating an internal configuration of the second coin handling apparatus according to the embodiment of the present disclosure when viewed from a right side, illustrating a state when coins collected by the coin transport cassette are counted.
Figure 11B:
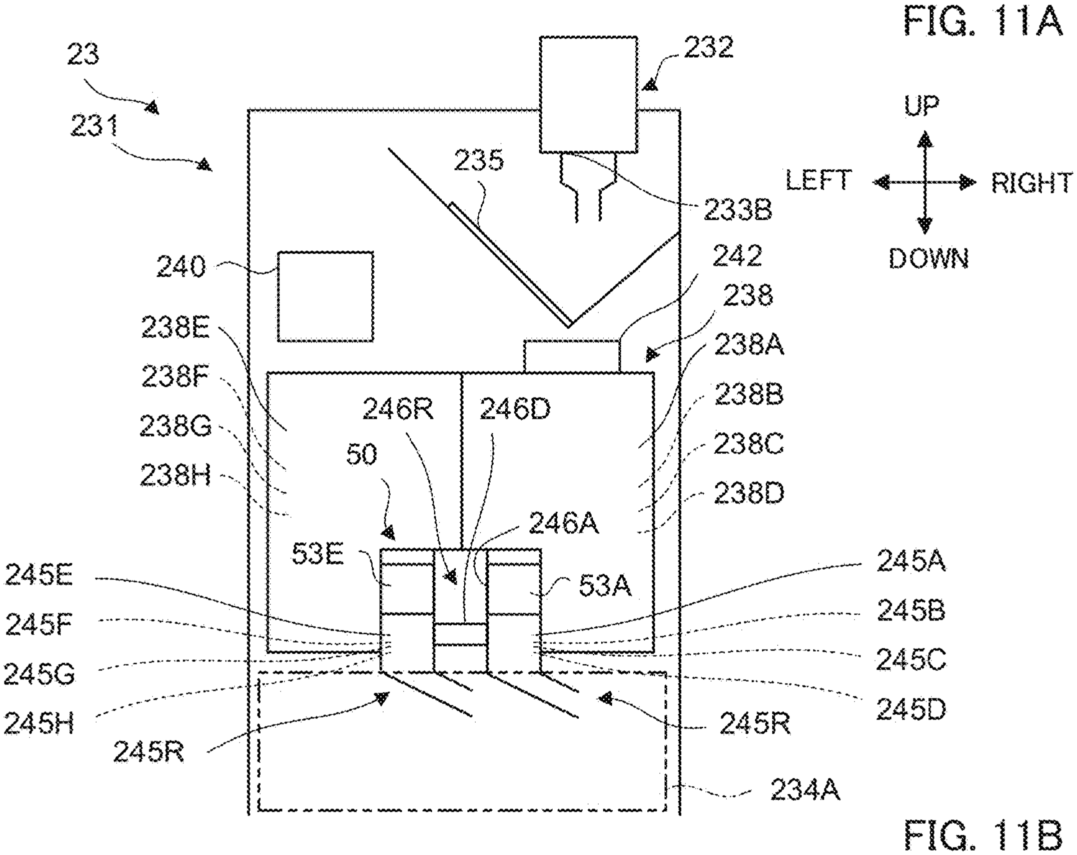
FIG. 11B is a schematic diagram illustrating the internal configuration of the second coin handling apparatus in the state of FIG. 11A according to the embodiment of the present disclosure when viewed from a front side.
Figure 12:
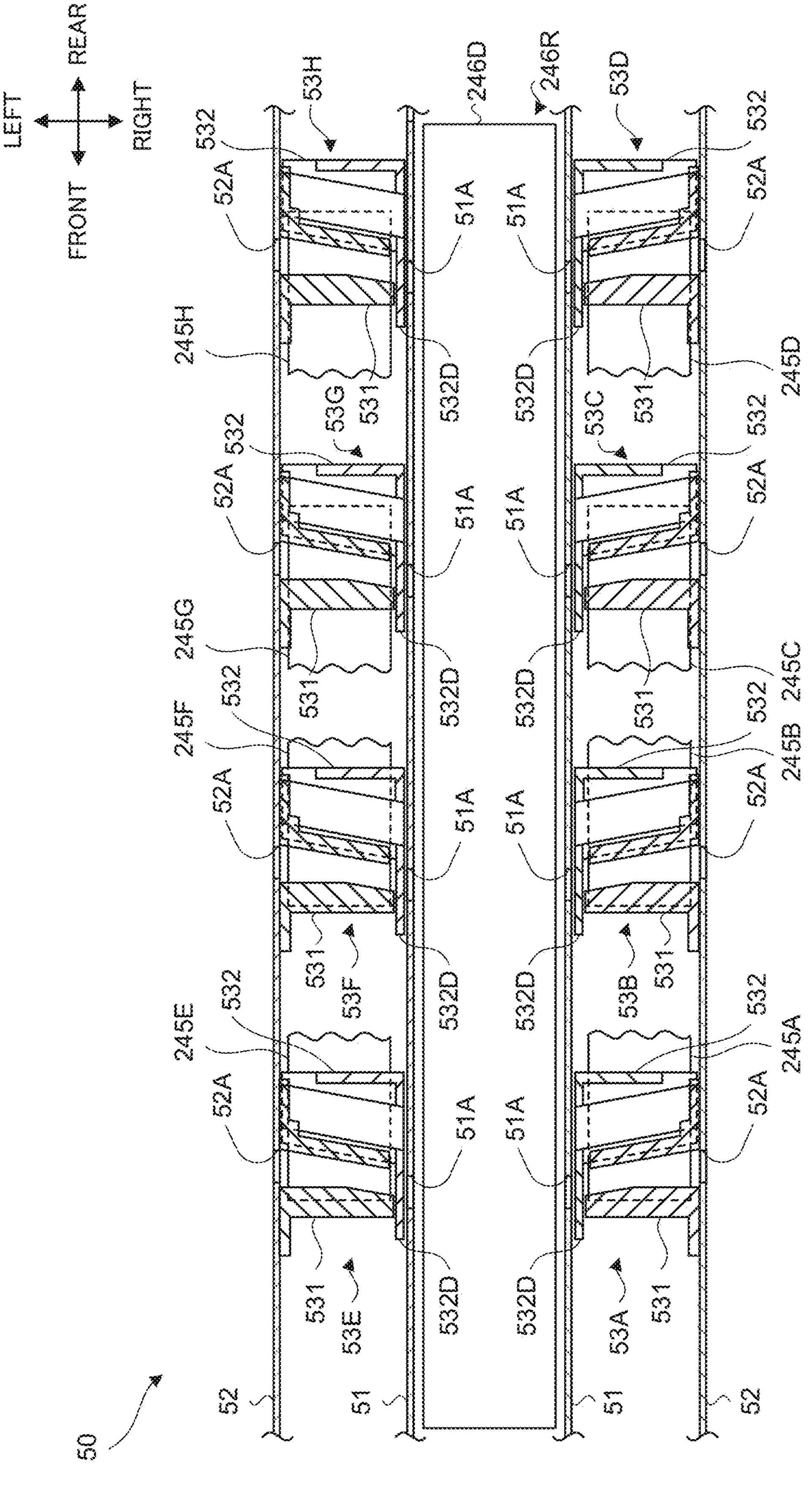
FIG. 12 is a schematic diagram illustrating a schematic configuration of a switching unit according to the embodiment of the present disclosure.
Figure 13B:
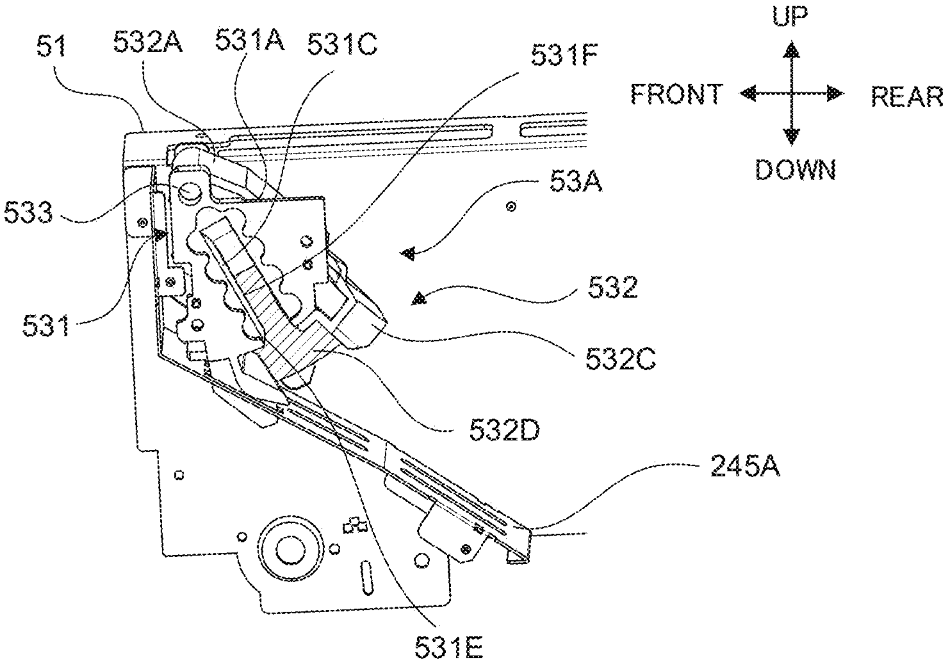
FIG. 13B is a perspective view illustrating the state of the switching mechanism when a coin is guided to the drawer according to the embodiment of the present disclosure.
Figure 14A:
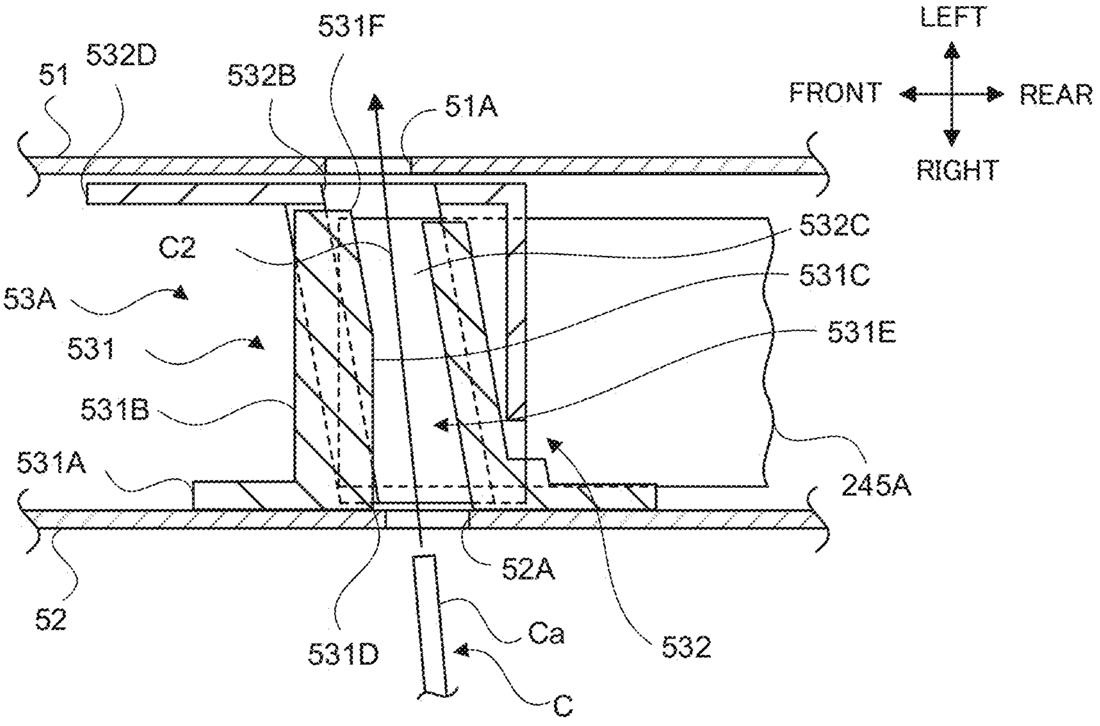
FIG. 14A is a schematic diagram illustrating the state of the switching mechanism when a coin is guided to the coin transport cassette according to the embodiment of the present disclosure.
Figure 14B:
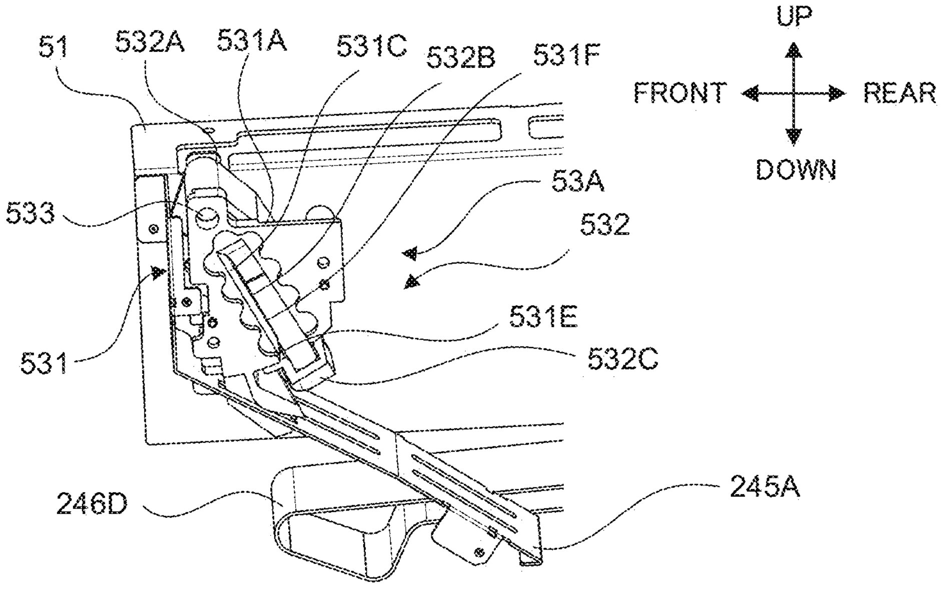
FIG. 14B is a perspective view illustrating the state of the switching mechanism when a coin is guided to the coin transport cassette according to the embodiment of the present disclosure.
Figure 15:
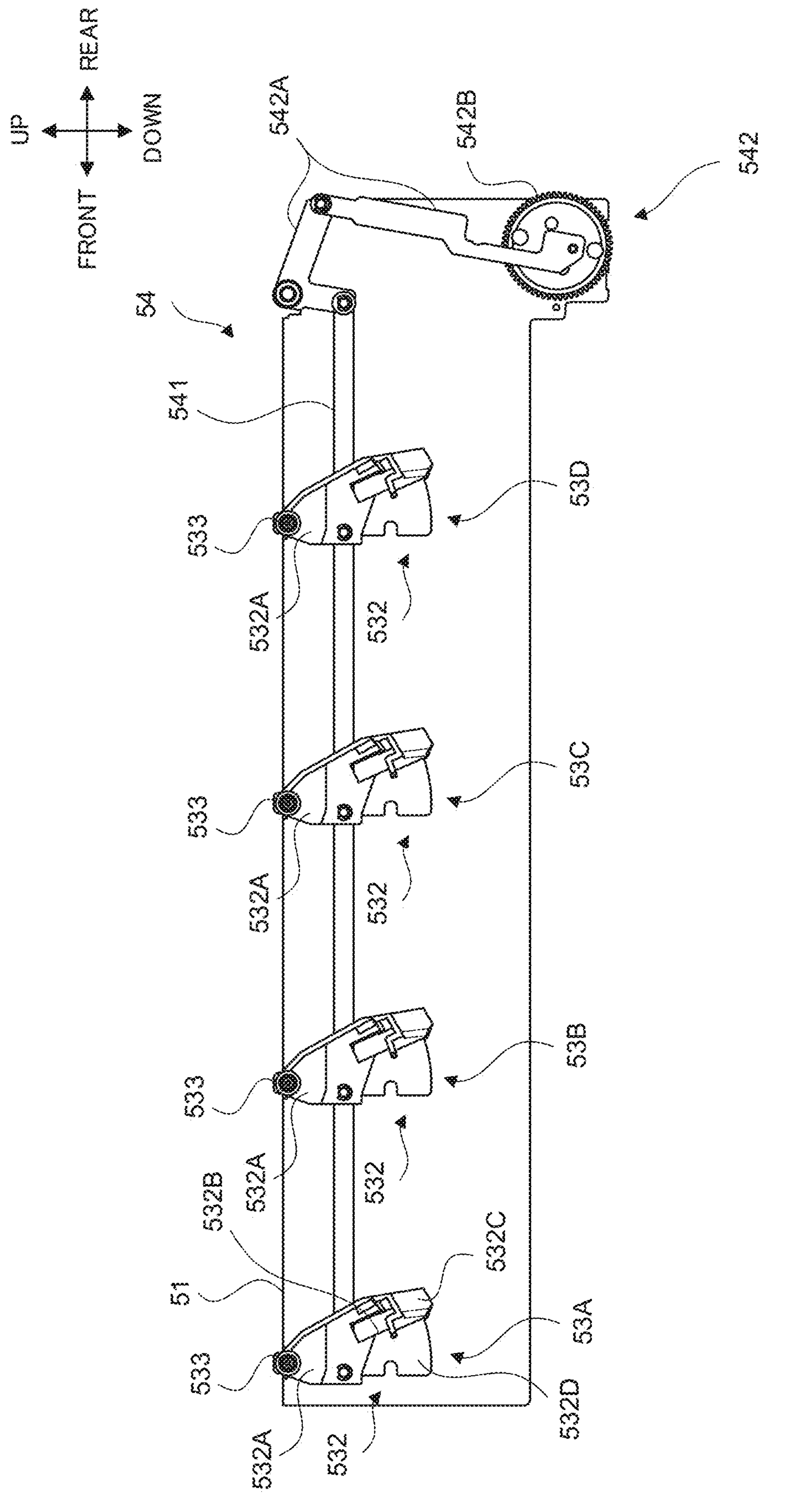
FIG. 15 is a side view illustrating a schematic configuration of a switching control unit according to the embodiment of the present disclosure.
Figure 16A:
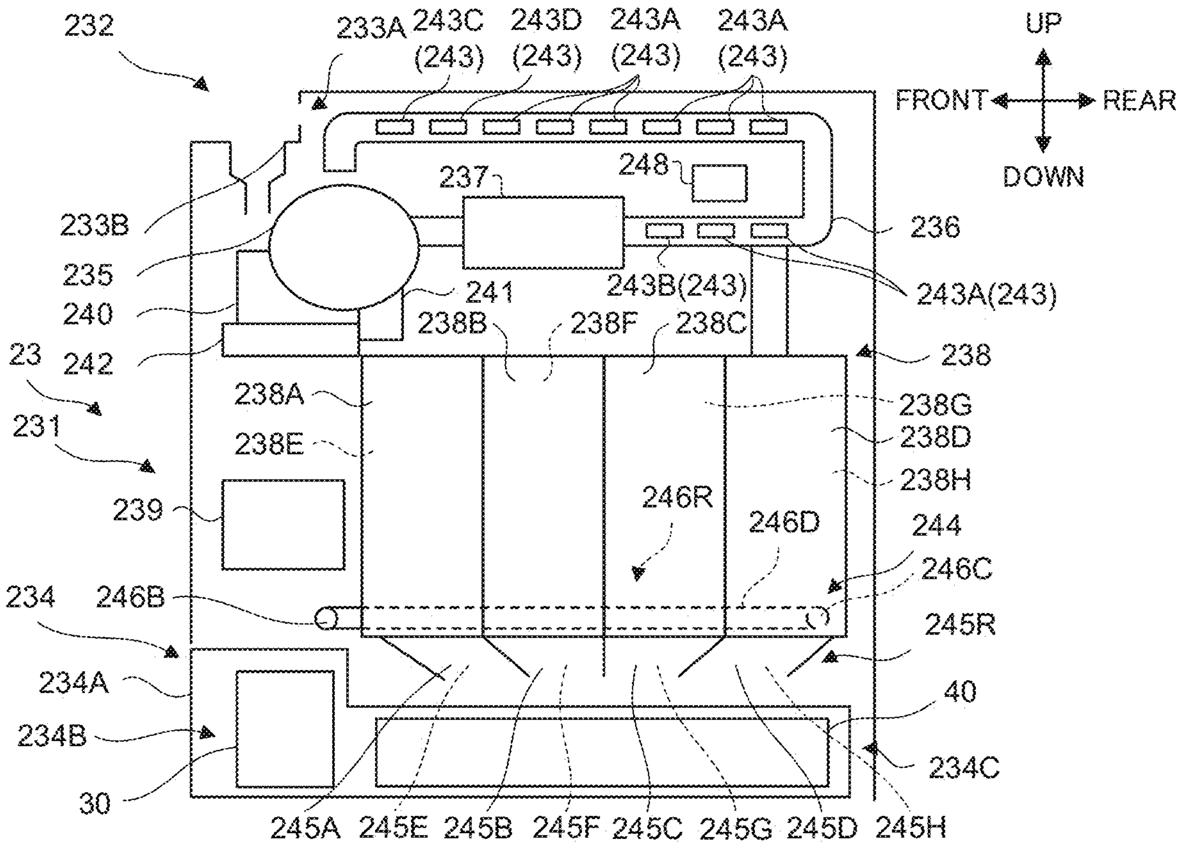
FIG. 16A is a schematic diagram illustrating the internal configuration of the second coin handling apparatus according to the embodiment of the present disclosure when viewed from the right side, illustrating a state when the drawer is replenished with a coin.
Figure 16B:
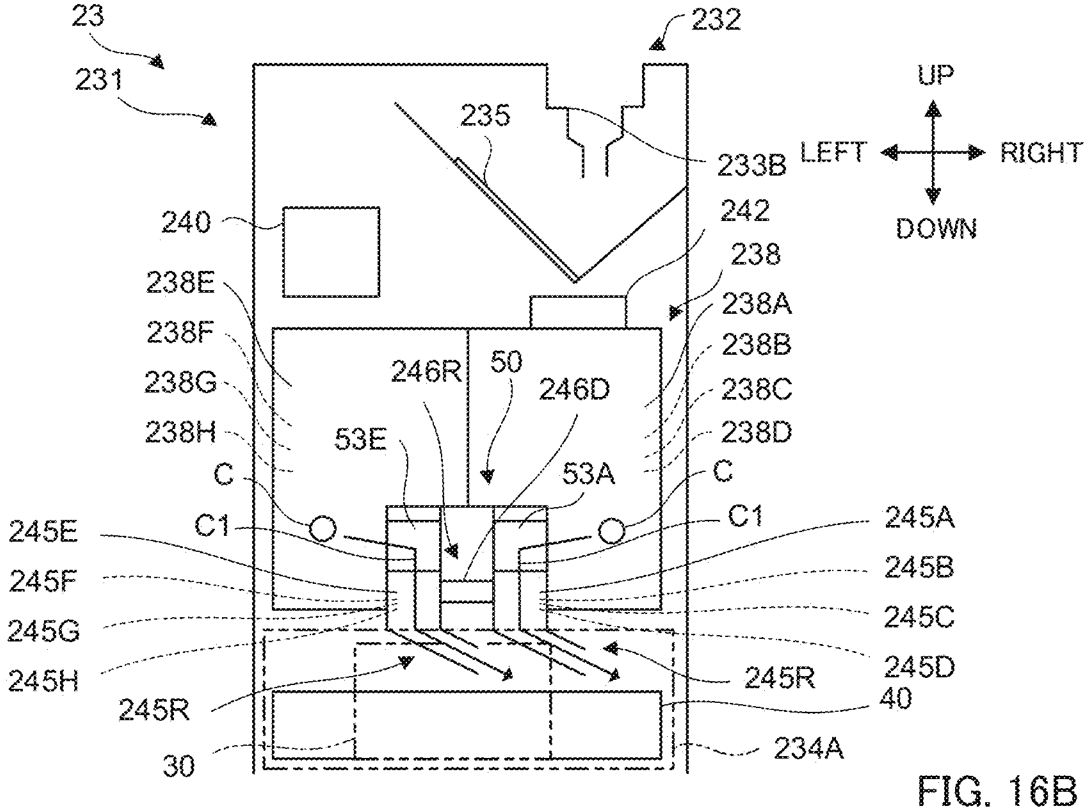
FIG. 16B is a schematic diagram illustrating the internal configuration of the second coin handling apparatus in the state of FIG. 16A according to the embodiment of the present disclosure when viewed from the front side.
Figure 17A:
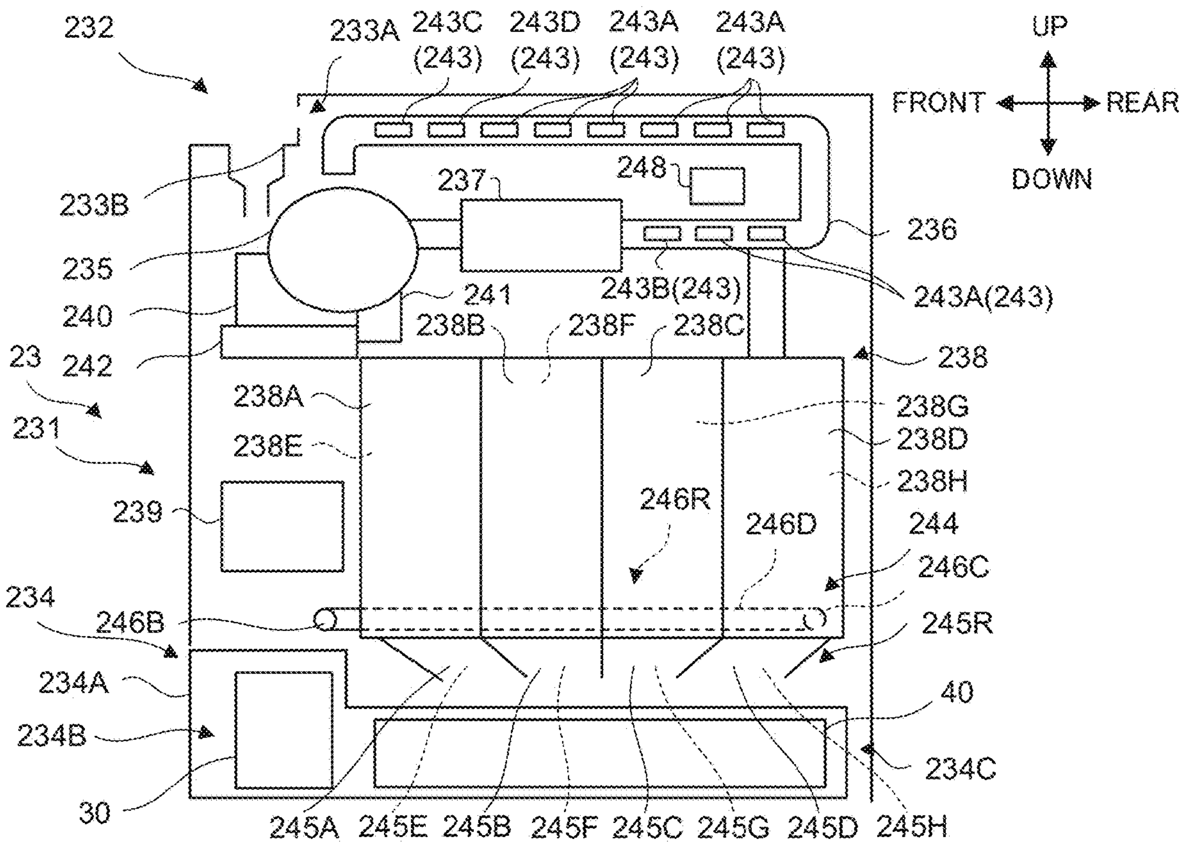
FIG. 17A is a schematic diagram illustrating the internal configuration of the second coin handling apparatus according to the embodiment of the present disclosure when viewed from the right side, illustrating a state when the coin transport cassette is replenished with a coin.
Figure 17B:
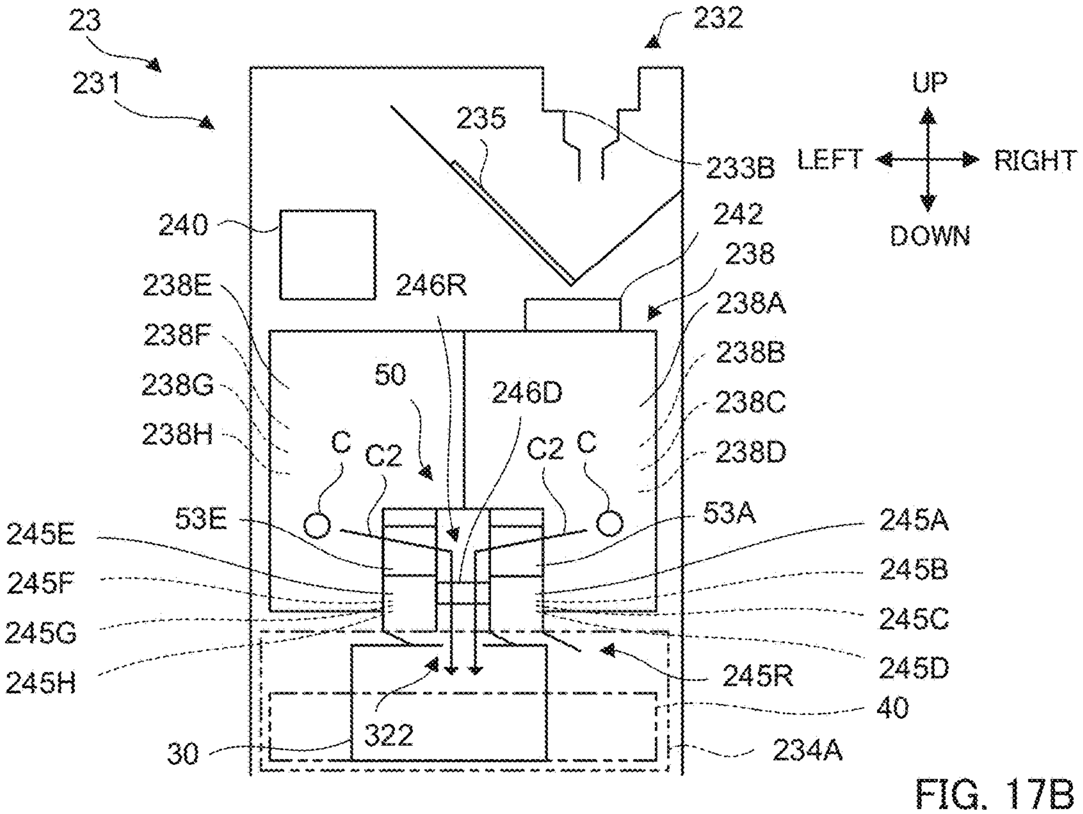
FIG. 17B is a schematic diagram illustrating the internal configuration of the second coin handling apparatus in the state of FIG. 17A according to the embodiment of the present disclosure when viewed from the front side.

Next, a configuration of the second coin handling apparatus 23 will be described. FIG. 7 is a perspective view of an external appearance of the second coin handling apparatus. FIG. 8A is a perspective view illustrating a state in which a cover of the second coin handling apparatus is opened. FIG. 8B is a perspective view illustrating a state in which the coin transport cassette is attached to the second coin handling apparatus. FIG. 9A is a perspective view illustrating a state in which a tray covers an exposure port of the cover. FIG. 9B is a perspective view illustrating a state in which the tray does not cover the exposure port of the cover. FIG. 10A is a perspective view illustrating how the coin transport cassette is attached to the second coin handling apparatus. FIG. 10B is a perspective view illustrating how a drawer is attached to the second coin handling apparatus. FIG. 11A is a schematic diagram illustrating an internal configuration of the second coin handling apparatus when viewed from a right side, illustrating a state when coins collected by the coin transport cassette are counted. FIG. 11B is a schematic diagram illustrating the internal configuration of the second coin handling apparatus in the state of FIG. 11A when viewed from a front side. FIG. 12 is a schematic diagram illustrating a schematic configuration of a switching unit. FIG. 13A is a schematic diagram illustrating a state of a switching mechanism when a coin is guided to the drawer. FIG. 13B is a perspective view illustrating the state of the switching mechanism when a coin is guided to the drawer. FIG. 14A is a schematic diagram illustrating the state of the switching mechanism when a coin is guided to the coin transport cassette. FIG. 14B is a perspective view illustrating the state of the switching mechanism when a coin is guided to the coin transport cassette. FIG. 15 is a side view illustrating a schematic configuration of a switching control unit. FIG. 16A is a schematic diagram illustrating the internal configuration of the second coin handling apparatus when viewed from the right side, illustrating a state when the drawer is replenished with a coin. FIG. 16B is a schematic diagram illustrating the internal configuration of the second coin handling apparatus in the state of FIG. 16A when viewed from the front side. FIG. 17A is a schematic diagram illustrating the internal configuration of the second coin handling apparatus when viewed from the right side, illustrating a state when the coin transport cassette is replenished with a coin. FIG. 17B is a schematic diagram illustrating the internal configuration of the second coin handling apparatus in the state of FIG. 17A when viewed from the front side.

First, a configuration of the second coin handling apparatus 23 visible from the outside will be described. As illustrated in FIG. 7, FIG. 8A and FIG. 8B, the second coin handling apparatus 23 comprises a housing 231, a second cassette attachment unit 232, a depositing unit 233, and a dispensing unit 234.

The housing 231 comprises a first front surface portion 231A, and a second front surface portion 231B located upward from the first front surface portion 231A. The second front surface portion 231B is located rearward from the first front surface portion 231A, and is provided such that the surface of the second front surface portion 231B is parallel to a surface direction of the first front surface portion 231A. The housing 231 comprises a first upper surface portion 231C, and a second upper surface portion 231D located frontward from the first upper surface portion 231C. The second upper surface portion 231D is located downward from the first upper surface portion 231C, and is provided such that the surface of the second upper surface portion 231D is substantially parallel to the surface of the first upper surface portion 231C.

The second cassette attachment unit 232 is formed of a downwardly recessed portion provided in the second upper surface portion 231D. The length of the second cassette attachment unit 232 in the left-right direction is slightly longer than the length of the coin transport cassette 30 in the left-right direction. The second cassette attachment unit 232 is provided with the guide rail 232A extending frontward and rearward. As illustrated in FIG. 8B, the second cassette attachment unit 232 is configured such that the coin transport cassette 30 is attachable to the second cassette attachment unit 232 with the discharge port 341 facing rearward. The second cassette attachment unit 232 is configured such that, when the coin transport cassette 30 is attached to the second cassette attachment unit 232, the connector 36 of the coin transport cassette 30 is connected to a connector (not illustrated) of the second cassette attachment unit 232. A clerk can easily perform the attachment operation by fitting the guide rail 232A into the second guide groove 316A of the coin transport cassette 30 and sliding the coin transport cassette 30. In addition, it is possible to make it hard for a wrong attachment direction of the coin transport cassette 30 to be taken by fitting the guide rail 232A into the second guide groove 316A when the coin transport cassette 30 is attached to the second cassette attachment unit 232. Further, it is possible to restrain damage or degradation of the connector of the second cassette attachment unit 232 and the connector 36 of the coin transport cassette 30.

The depositing unit 233 is provided in an upper and front portion of the housing 231. That is, the depositing unit 233 is provided on a side on which a clerk stands when operating the second coin handling apparatus 23. The depositing unit 233 is configured such that the coin C can be deposited into the second coin handling apparatus 23. As illustrated in FIG. 8A and FIG. 8B, the depositing unit 233 comprises a first reception port 233A, a second reception port 233B, and a cover 233C.

As illustrated in FIG. 8A, the first reception port 233A is an opening provided in the second front surface portion 231B. The first reception port 233A is provided at a position facing the discharge port 341 of the coin transport cassette 30 attached to the second cassette attachment unit 232. The first reception port 233A is configured to be capable of receiving the coin C discharged rearward from the coin transport cassette 30.

The second reception port 233B is an opening provided in a bottom surface portion of the downwardly recessed portion provided in the second upper surface portion 231D, that is, in a bottom surface portion forming the second cassette attachment unit 232. As illustrated in FIG. 8B, the second reception port 233B is configured to be covered by the coin transport cassette 30 when the coin transport cassette 30 is attached to the second cassette attachment unit 232. That is, when the coin transport cassette 30 is attached to the second cassette attachment unit 232, it is configured such that the coin C cannot be deposited through the second reception port 233B into the second coin handling apparatus 23.

The cover 233C is configured to turn around a rotating shaft (not illustrated) provided in the first upper surface portion 231C of the housing 231 and extending rightward and leftward, and is configured to be switchable between a closed state in which the cover 233C covers the first reception port 233A and the second cassette attachment unit 232 as illustrated in FIG. 7 and an open state in which the cover 233C does not cover the first reception port 233A and the second cassette attachment unit 232 as illustrated in FIG. 8A and FIG. 8B. The cover 233C is provided with an exposure port 233C1 that exposes the second reception port 233B when the cover 233C is in the closed state.

As illustrated in FIG. 9A, the cover 233C is provided with a tray 233D. The tray 233D is configured such that the attitude thereof can be changed between an attitude in which the tray 233D covers the exposure port 233C1 of the cover 233C as illustrated in FIG. 9A and an attitude in which the tray 233D does not cover the exposure port 233C1 as illustrated in FIG. 9B.

As illustrated in FIG. 10A, the dispensing unit 234 comprises a drawer portion 234A that can be drawn from a lower portion of the housing 231 onto a side of a clerk. A first cassette attachment unit 234B is provided in a front-side portion in the drawer portion 234A. As illustrated in FIG. 10B, the coin transport cassette 30 is attached to the first cassette attachment unit 234B. The first cassette attachment unit 234B is configured such that, when the coin transport cassette 30 is attached to the first cassette attachment unit 234B, the connector 36 of the coin transport cassette 30 is connected to a connector (not illustrated) of the first cassette attachment unit 234B. As illustrated in FIG. 10B, a drawer attachment unit 234C is provided on a side rearward from the first cassette attachment unit 234B in the drawer portion 234A. As illustrated in FIG. 10A, the drawer 40 is attached to the drawer attachment unit 234C. That is, the first cassette attachment unit 234B is provided at a position different from a position of the drawer attachment unit 234C. Specifically, the first cassette attachment unit 234B is configured such that the coin transport cassette 30 is attachable to the first cassette attachment unit 234B at a position frontward from a position of the drawer 40. Such a configuration makes it possible to attach the coin transport cassette 30 to the first cassette attachment unit 234B when the drawer 40 is attached to the drawer attachment unit 234C.

Next, an internal configuration of the second coin handling apparatus 23 will be described. As illustrated in FIG. 11A and FIG. 11B, the second coin handling apparatus 23 further comprises a feeding unit 235, an upper-side transport unit 236, a recognition unit 237, a storage unit 238, a reject unit 239, an overflow storage unit 240, a forged coin storage unit 241, a return unit 242, a plurality of upper-side chutes 243, a lower-side transport unit 244, a switching unit 50, and a control unit 248.

The feeding unit 235 is configured to be capable of receiving the coin C deposited from the coin transport cassette 30 via the first reception port 233A and the coin C deposited through the second reception port 233B, feeding out the coin C one by one, and causing the coin C to fall into the return unit 242. As a mechanism to feed out the coin C in the feeding unit 235, it is possible to exemplify a configuration similar to that of the storage units 135A to 135H of the first coin handling apparatus 13.

The upper-side transport unit 236 is an example of a second transport unit that transports the coin C fed out of the feeding unit 235.

As illustrated in FIG. 11A, the recognition unit 237 is provided in the upper-side transport unit 236, recognizes denomination, authenticity, fitness, and/or the like of the coin C deposited through the depositing unit 233, and counts the coin C.

The storage unit 238 comprises storage boxes 238A, 238B, 238C, 238D, 238E, 238F, 238G, and 238H (which may be referred to hereinafter as "storage boxes 238A to 238H"). The storage boxes 238A to 238H are configured to be capable of storing the coin C and feeding out the coin C that has been stored. The storage boxes 238A to 238D are provided so as to be side by side in the front-rear direction on the right side in the housing 231. The storage boxes 238E to 238H are provided so as to be side by side in the front-rear direction on the left side in the housing 231. In FIG. 11A, the storage boxes 238E to 238H are hidden behind the storage boxes 238A to 238D. In FIG. 11B, the storage boxes 238B to 238D and 238F to 238H are hidden behind the storage boxes 238A and 238E. Denominations that are stored in the storage boxes 238A to 238H, respectively, are set in advance. As a mechanism to feed out the coin C in the storage boxes 238A to 238H, it is possible to exemplify a mechanism similar to that of the storage units 135A to 135H.

The reject unit 239 stores, as a rejected coin, the coin C recognized not as a coin to be handled or as unrecognizable by the recognition unit 237. The reject unit 239 is configured to be drawable from a side of a front surface of the housing 231 by opening a cover (not illustrated) of the housing 231.

The overflow storage unit 240 stores, as an overflow coin, the coin C that cannot be held in a case where the holding number of the coin C in the storage boxes 238A to 238H exceeds a predetermined holding number that has been set. The overflow storage unit 240 is configured to be drawable from the side of the front surface of the housing 231.

The forged coin storage unit 241 stores the coin C recognized as a forged coin by the recognition unit 237. The forged coin storage unit 241 is configured to be drawable from the side of the front surface of the housing 231.

The return unit 242 stores the coin C that has fallen from the feeding unit 235. The return unit 242 is configured to be drawable from the side of the front surface of the housing 231.

The upper-side chutes 243 are provided downstream of the recognition unit 237 in the upper-side transport unit 236 in the transport direction of the coin C. The upper-side chutes 243 are provided side by side in a row in the transport direction of the coin C. Of the plurality of upper-side chutes 243, eight upper-side chutes 243A are configured to be capable of guiding the coin C to any one of the storage boxes 238A to 238H. Another chute 243B is configured to be capable of guiding a rejected coin to the reject unit 239. Yet another upper-side chute 243C is configured to be capable of guiding an overflow coin to the overflow storage unit 240. One upper-side chute 243D that is the remaining upper-side chute 243 is configured to be capable of guiding a forged coin to the forged coin storage unit 241. The upper-side chutes 243 are normally closed by gates (not illustrated), and guide the coin C to each portion described above by opening the gates.

The lower-side transport unit 244 is an example of a first transport unit that transports the coin C fed out of the storage unit 238 to the drawer 40 attached to the drawer attachment unit 234C or to the coin transport cassette 30 attached to the first cassette attachment unit 234B. The lower-side transport unit 244 comprises a first route forming portion 245 and a second route forming portion 246.

The first route forming portion 245 forms a first route 245R that guides the coin C fed out of the storage unit 238 to the drawer 40 attached to the drawer attachment unit 234C. The first route forming portion 245 comprises drawer chutes 245A, 245B, 245C, 245D, 245E, 245F, 245G, and 245H (which may be referred to hereinafter as "drawer chutes 245A to 245H"). The drawer chutes 245A to 245H are examples of a first chute. The drawer chutes 245A to 245H are provided one by one downward from the storage boxes 238A to 238H, respectively. In FIG. 11A, the drawer chutes 245E to 245H are hidden behind the drawer chutes 245A to 245D. In FIG. 11B, the drawer chutes 245B to 245D and 245F to 245H are hidden behind the drawer chutes 245A and 245E. The drawer chutes 245A to 245H are configured to be capable of guiding the coin C stored in the storage boxes 238A to 238H to the drawer 40 attached to the drawer attachment unit 234C.

The second route forming portion 246 forms a second route 246R that guides the coin C fed out of the storage unit 238 to the coin transport cassette 30 attached to the first cassette attachment unit 234B. The second route forming portion 246 is provided between a row formed of the drawer chutes 245A to 245D in the front-rear direction and a row formed of the drawer chutes 245E to 245H in the front-rear direction. The second route forming portion 246 comprises a cassette chute 246A, a transport motor (not illustrated), a driving pulley 246B, a driven pulley 246C, and a transport belt 246D. The cassette chute 246A is an example of a second chute. The cassette chute 246A is formed of a pair of first plate-like members 51 to be described later, and guides the coin C fed out of the storage unit 238 onto the transport belt 246D. The transport motor is driven by control of the control unit 248. The driving pulley 246B is provided on a rotating shaft of the transport motor so as to extend rightward and leftward in a front and lower portion of the housing 231. The driven pulley 246C is received by a bearing (not illustrated) so as to extend rightward and leftward in a rear and lower portion of the housing 231. The transport belt 246D is wound around the driving pulley 246B and the driven pulley 246C. The transport belt 246D is configured to be capable of guiding the coin C stored in the storage boxes 238A to 238H to the second reception port 322 of the coin transport cassette 30 attached to the first cassette attachment unit 234B.

The switching unit 50 is driven by control of the control unit 248. The switching unit 50 switches a guide destination of the coin C stored in the storage boxes 238A to 238H to the first route 245R (the drawer chutes 245A to 245H) as illustrated in FIG. 16A and FIG. 16B or the second route 246R (the cassette chute 246A and the transport belt 246D) as illustrated in FIG. 17A and FIG. 17B. As illustrated in FIG. 12, the switching unit 50 comprises the pair of first plate-like members 51, a pair of second plate-like members 52, and switching mechanisms 53A, 53B, 53C, 53D, 53E, 53F, 53G, and 53H (which may be referred to hereinafter as "switching mechanisms 53A to 53H").

One first plate-like member 51 of the pair of first plate-like members 51 is provided between the drawer chutes 245A to 245D and the transport belt 246D. The other first plate-like member 51 is provided between the drawer chutes 245E to 245H and the transport belt 246D. The length of the pair of first plate-like members 51 in the front-rear direction is longer than the length of the transport belt 246D in the front-rear direction. However, the length of the pair of first plate-like members 51 in the front-rear direction may be shorter than the length of the transport belt 246D in the front-rear direction. Portions of the pair of first plate-like members 51 on an upper side with respect to the transport belt 246D form the cassette chute 246A. Each of the pair of first plate-like members 51 is provided with four first coin passage holes 51A. Each of the first coin passage holes 51A is formed in a longitudinal shape (slit shape) so as to allow the coin C to pass therethrough in an attitude in which the coin C moves parallel to a surface of the coin C. The first coin passage holes 51A are provided at predetermined intervals in the front-rear direction.

One second plate-like member 52 of the pair of second plate-like members 52 is provided between the drawer chutes 245A to 245D and the storage boxes 238A to 238D. The other second plate-like member 52 is provided between the drawer chutes 245E to 245H and the storage boxes 238E to 238H. Each of the pair of second plate-like member 52 is provided with four second coin passage holes 52A. In the same manner as the first coin passage holes 51A, each of the second coin passage holes 52A is formed in a longitudinal shape (slit shape) so as to allow the coin C to pass therethrough in an attitude in which the coin C moves parallel to the surface of the coin C. The second coin passage holes 52A are provided at predetermined intervals in the front-rear direction. For example, the second coin passage holes 52A are provided at positions substantially opposite to those of the first coin passage holes 51A and at substantially the same intervals as those of the first coin passage holes 51A.

The switching mechanisms 53A to 53D are provided between the one first plate-like member 51 and the one second plate-like member 52. The switching mechanisms 53A to 53D are provided at predetermined intervals in the front-rear direction. For example, the switching mechanisms 53A to 53D are provided at substantially the same intervals as those of the first coin passage holes 51A. The switching mechanisms 53A to 53D switch the guide destination of the coin C, which has been fed out of each of the storage boxes 238A to 238D and has passed through the second coin passage holes 52A, to the first route 245R or the second route 246R. The switching mechanisms 53E to 53H are provided between the other first plate-like member 51 and the other second plate-like member 52. In the same manner as the switching mechanisms 53A to 53D, the switching mechanisms 53E to 53H are provided at predetermined intervals in the front-rear direction. The switching mechanisms 53E to 53H switch the guide destination of the coin C, which has been fed out of each of the storage boxes 238E to 238H and has passed through the second coin passage holes 52A, to the first route 245R or the second route 246R. The switching mechanisms 53A to 53H have the same configuration. The switching mechanism 53A to 53H each comprise a fixing member 531, and a blocking member 532.

As illustrated in FIG. 13A, FIG. 13B, FIG. 14A, and FIG. 14B, the fixing member 531 comprises a fixed portion 531A and a fixing member main body 531B. The fixed portion 531A is fixed to a surface of the second plate-like member 52 on a side of the first plate-like member 51. The fixing member main body 531B is provided so as to extend from the fixed portion 531A in a direction of the first plate-like member 51 and so as not to come into contact with the first plate-like member 51.

The fixing member main body 531B is provided with an attitude defining portion 531C which has a groove-shape, which penetrates in the left-right direction, and whose lower portion opens. The attitude defining portion 531C defines an attitude of the coin C such that the coin C moves parallel to a surface Ca of the coin C.

The attitude defining portion 531C comprises an opening on a side of the second plate-like member 52, and the opening is a coin reception port 531D that receives the coin C fed out of the storage boxes 238A to 238H via the second coin passage hole 52A. The lower portion of the attitude defining portion 531C comprises an opening that is a first opening 531E configured to be capable of discharging the coin C to the first route 245R. The attitude defining portion 531C comprises an opening on a side of the first plate-like member 51, and the opening is a second opening 531F configured to be capable of discharging the coin C to the second route 246R via the first coin passage hole 51A.

The blocking member 532 comprises a blocking member main body 532A. The blocking member main body 532A is provided to be turnable in the front-rear direction around a rotating shaft 533 extending between the fixing member 531 and the first plate-like member 51 in the left-right direction.

A coin passage hole 532B is provided on a rear side of a lower portion of the blocking member main body 532A. The coin passage hole 532B is configured such that the coin C that has exited from the second opening 531F of the fixing member 531 can pass through the coin passage hole 532B without changing the attitude of the coin C.

A first opening blocking unit 532C is provided downward from the coin passage hole 532B of the blocking member main body 532A. The first opening blocking unit 532C is provided so as to extend from the blocking member main body 532A in a direction of the second plate-like member 52 and so as not to come into contact with the second plate-like member 52. The first opening blocking unit 532C is configured to be capable of blocking the first opening 531E of the fixing member 531.

A second opening blocking unit 532D is provided on a front side of the coin passage hole 532B of the blocking member main body 532A. The second opening blocking unit 532D is formed in a plate shape. As illustrated in FIG. 12, FIG. 13A, and FIG. 13B, the second opening blocking unit 532D is configured to be capable of blocking the second opening 531F of the fixing member 531 when the first opening blocking unit 532C does not block the first opening 531E. As illustrated in FIG. 14A and FIG. 14B, the second opening blocking unit 532D is configured not to block the second opening 531F of the fixing member 531 when the first opening blocking unit 532C blocks the first opening 531E. Note that, the shape of the second opening blocking unit 532D is not limited to a plate shape, and may be any other shape.

As illustrated in FIG. 15, the switching unit 50 further comprises a pair of switching control units 54 (only one switching control unit 54 is illustrated). Each of the switching control units 54 comprises a connection member 541, and a connection member moving unit 542. The connection member 541 of the one switching control unit 54 of the pair of switching control units 54 connects the respective blocking members 532 of the switching mechanisms 53A to 53D provided in the one first plate-like member 51, and the connection member 541 of the other switching control unit 54 connects the respective blocking members 532 of the switching mechanisms 53E to 53H provided in the other first plate-like member 51. The connection member moving unit 542 moves the connection member 541 in the front-rear direction by control of the control unit 248. The connection member moving unit 542 comprises, for example, a link member 542A, a gear 542B, and a gear driving mechanism (not illustrated) that rotates the gear 542B. Each of the switching control units 54 switches the switching mechanisms 53A to 53H to the state illustrated in FIG. 12, FIG. 13A, and FIG. 13B or the state illustrated in FIG. 14A and FIG. 14B by moving the blocking members 532, whose number is four and which are connected to each of the connection members 541, in the same direction simultaneously.

The control unit 248 controls entire operation of the second coin handling apparatus 23. The control unit 248 counts coins collected from the first coin handling apparatus 13 by the coin transport cassette 30 and the coin C collected from the POS register apparatus 14 by the drawer 40. The control unit 248 replenishes the coin transport cassette 30 or the drawer 40 with the coin C stored in the storage boxes 238A to 238H. Such counting processing and replenishment processing of the coin C will be described later.

Further, an operation display (not illustrated) is connected to the second coin handling apparatus 23. As the operation display, it is possible to exemplify a configuration similar to that of the operation display 15 connected to the first coin handling apparatus 13. The second coin handling apparatus 23 functions as an operation unit for inputting information on money handling in the second banknote handling apparatus 22 and the second coin handling apparatus 23, and as a display displays information on money handling.

<Operation of Money Handling System>

[Counting Processing of Coin Collected by Coin Transport Cassette in Second Coin Handling Apparatus]

First, as operation of the money handling system 1, counting processing of the coin C collected from the first coin handling apparatus 13 by the coin transport cassette 30 in the second coin handling apparatus 23 will be described.

As illustrated in FIG. 8A, a clerk opens the cover 233C to expose the second cassette attachment unit 232. The clerk attaches the coin transport cassette 30, in which the first reception port 321, the second reception port 322 and the discharge port 341 are closed, to the second cassette attachment unit 232 as illustrated in FIG. 8B. When the coin transport cassette 30 is attached to the second cassette attachment unit 232, the second coin handling apparatus 23 begins to supply power to the coin transport cassette 30 via the connector of the second cassette attachment unit 232. The control unit 248 of the second coin handling apparatus 23 controls the coin transport cassette 30 such that the coin C stored in the coin transport cassette 30 is discharged.

The control unit 248 controls the opening and closing motor of the discharge port opening and closing unit 342 of the coin transport cassette 30 such that the discharge port 341 is opened. Next, the control unit 248 controls the transport motor of the feeding unit 35 of the coin transport cassette 30 such that the transport belt 351C rotates, thereby sequentially discharging the coin C stored in the storage unit 33 so as to be fed out of the discharge port 341. When a sensor (not illustrated) detects that all of the coin C stored in the storage unit 33 has been discharged, the control unit 248 controls the transport motor of the feeding unit 35 to cause the rotation of the transport belt 351C to end, and controls the opening and closing motor of the discharge port opening and closing unit 342 such that the discharge port 341 is closed.

On the other hand, the coin C fed out of the coin transport cassette 30 passes through the first reception port 233A, and falls into the feeding unit 235 via a feeding mechanism (not illustrated) provided in the first reception port 233A on an inner side of the housing 231. The control unit 248 controls the feeding unit 235 and the upper-side transport unit 236 such that the coin C fed out of the coin transport cassette 30 is transported. The coin that is transported is subjected to recognition of denomination, authenticity, fitness, and/or the like by the recognition unit 237. The control unit 248 controls the upper-side transport unit 236 and the gates based on a recognition result by the recognition unit 237 such that the coin C that can be deposited is stored in the storage boxes 238A to 238H for each denomination, and that a rejected coin, an overflow coin, and a forged coin are stored in the reject unit 239, the overflow storage unit 240, and the forged coin storage unit 241, respectively. When the counting of all of the coin C stored in the coin transport cassette 30 is completed, the control unit 248 transmits information on the denominations and number of the coin C, which has been counted, to the money management apparatus 25. Thereafter, a clerk detaches the coin transport cassette 30 from the second coin handling apparatus 23, and closes the cover 233C as illustrated in FIG. 7.

[Counting Processing of Coin Collected by Drawer in Second Coin Handling Apparatus]

Next, as operation of the money handling system 1, counting processing of the coin C collected by the drawer 40 in the second coin handling apparatus 23 will be described. Note that, a difference between the counting processing of the coin C collected by the drawer 40 and the counting processing of the coin C collected by the coin transport cassette 30 lies in processing when placing the coin C into the housing 231 of the second coin handling apparatus 23, so that processing after the coin C is placed into the housing 231 will be described in a simplified manner.

In the states illustrated in FIG. 7 and FIG. 9A, the cover 233C is closed and the tray 233D covers the exposure port 233C1 of the cover 233C so that the coin transport cassette 30 cannot be attached to the second cassette attachment unit 232, and that the coin C cannot be deposited through the second reception port 233B into the second coin handling apparatus 23 either. In this state, a clerk inserts the coin C collected by the drawer 40 into the trays 233D. Next, the clerk turns the tray 233D so as to raise a side of a left end thereof, and causes the tray 233D to expose the exposure port 233C1 of the cover 233C as illustrated in FIG. 9B, whereby the coin C slides down and passes through the exposure port 233C1 and the second reception port 233B. Note that, when all of the coin C in the drawer 40 cannot be stored in the tray 233D at a time, the tray 233D that has been inclined may be returned to the original state to repeat the procedure described above.

The coin C that has passed through the second reception port 233B falls into the feeding unit 235 via a feeding mechanism (not illustrated) provided in the second reception port 233B on an inner side of the housing 231, and is stored in the storage boxes 238A to 238H, the reject unit 239, the overflow storage unit 240, or the forged coin storage unit 241 based on a recognition result by the recognition unit 237. When the delivery of all of the coin C inserted into the tray 233D to the second reception port 233B is completed, a clerk returns the tray 233D to the state illustrated in FIG. 9A.

[Replenishment Processing of Coin Transport Cassette and Drawer with Coin in Second Coin Handling Apparatus]

Next, as operation of the money handling system 1, replenishment processing of the coin transport cassette 30 and the drawer 40 with the coin C in the second coin handling apparatus 23 will be described.

A clerk draws the drawer portion 234A of the second coin handling apparatus 23 onto a side of the clerk, and attaches the drawer 40, which is empty, to the drawer attachment unit 234C as illustrated in FIG. 10A. Subsequently, the clerk attaches the coin transport cassette 30, which is empty and in which the first reception port 321, the second reception port 322, and the discharge port 341 are closed, to the first cassette attachment unit 234B. As illustrated in FIG. 16A, FIG. 16B, FIG. 17A, and FIG. 17B, the clerk pushes and inserts the drawer portion 234A into the housing 231 to realize a state in which the coin C can be stored in the coin transport cassette 30 and the drawer 40. When the drawer portion 234A is inserted into the housing 231, the second coin handling apparatus 23 begins to supply power to the coin transport cassette 30 via the connector of the first cassette attachment unit 234B. The control unit 248 of the second coin handling apparatus 23 controls the coin transport cassette 30 such that the second reception port 322 of the coin transport cassette 30 is opened.

The control unit 248 causes the first reception port 321 and the second reception port 322 to open simultaneously by controlling the opening and closing motor of the reception port opening and closing unit 323 of the coin transport cassette 30 to move the reception port blocking member 323A.

When the first reception port 321 and the second reception port 322 of the coin transport cassette 30 are opened, the control unit 248 causes the coin transport cassette 30 and the drawer 40 to be replenished with the coin C of predetermined denominations by a predetermined number.

For example, when the drawer 40 is replenished with the coin C, the control unit 248 controls the storage boxes 238A to 238H and the switching unit 50 such that the coin C fed out of the storage boxes 238A to 238H is guided to the first route 245R (the drawer chutes 245A to 245H) as indicated by an arrow C1 in FIG. 16B.

At this time, the control unit 248 first controls the pair of switching control units 54 such that the blocking members 532 of the switching mechanisms 53A to 53H are turned to realize the state illustrated in FIG. 12, FIG. 13A, and FIG. 13B. This control of the switching control units 54 realizes a state in which the second openings 531F of the fixing members 531 of the switching mechanisms 53A to 53H are blocked by the second opening blocking units 532D of the blocking members 532, and in which the first openings 531E are not blocked by the first opening blocking units 532C. The control unit 248 controls the storage boxes 238A to 238H such that the coin C is fed out. As illustrated in FIG. 13A, the coin C fed out of the storage boxes 238A to 238H passes through the second coin passage hole 52A and the coin reception port 531D in such an attitude in which the coin C moves parallel to the surface Ca. When the coin C moves in the switching mechanisms 53A to 53H, the coin C moves in a direction of the second opening 531F while the attitude of the coin C is defined by the attitude defining portion 531C such that the coin C moves parallel to the surface Ca. As indicated by the arrow C1, the coin C collides with the second opening blocking unit 532D that blocks the second opening 531F, and falls by its own weight or is forced to fall. Since the first opening 531E is not blocked by the first opening blocking unit 532C, the coin C passes through the first opening 531E and is guided to the drawer chutes 245A to 245H located downward from the switching mechanisms 53A to 53H. The drawer 40 is replenished with the coin guided to the drawer chutes 245A to 245H.

When the replenishment processing of the drawer 40 with the coin C in the storage boxes 238A to 238H is completed, the control unit 248 controls the storage boxes 238A to 238H and the switching unit 50 such that the coin C fed out of the storage boxes 238A to 238H is guided to the second route 246R (the transport belt 246D) as indicated by an arrow C2 in FIG. 17B in order that the coin transport cassette 30 is replenished with the coin C. Note that, the replenishment processing of the drawer 40 with the coin C may be performed after the replenishment processing of the coin transport cassette 30 with the coin C is completed.

At this time, the control unit 248 first controls the pair of switching control units 54 such that the blocking members 532 of the switching mechanisms 53A to 53H are turned in a direction intersecting the surface Ca of the coin C (a direction substantially parallel to a thickness direction of the coin C) that moves by the definition of the attitude defining portion 531C, to thereby realize the state illustrated in FIG. 14A and FIG. 14B. In the present embodiment, the control unit 248 causes the blocking members 532 to be turned in the front direction. This control of the switching control units 54 realizes a state in which the first openings 531E of the fixing members 531 of the switching mechanisms 53A to 53H are blocked by the first opening blocking units 532C and in which the second openings 531F are not blocked by the second opening blocking units 532D of the blocking members 532. The control unit 248 controls the storage boxes 238A to 238H such that the coin C is fed out in the same manner as in the replenishment processing of the drawer 40 with the coin C. The coin C passes through the second coin passage hole 52A and the coin reception port 531D, and moves in the direction of the second opening 531F while the attitude of the coin C is defined by the attitude defining portion 531C such that the coin C moves parallel to the surface Ca. The coin C passes through the second opening 531F and the first coin passage hole 51A as indicated by the arrow C2 while a lower end of the coin C is supported by the first opening blocking unit 532C. The coin C that has passed through the first coin passage hole 51A falls by its own weight, and is guided onto the transport belt 246D via the cassette chute 246A.

The control unit 248 further controls the transport motor of the second route forming portion 246 such that the coin transport cassette 30 is replenished with the coin C, which has been guided onto the transport belt 246D, via the second reception port 322.

In this manner, the coin transport cassette 30 and the drawer 40 can be replenished with the coin C in the storage boxes 238A to 238H without detaching the coin transport cassette 30 and the drawer 40 from the second coin handling apparatus 23.

When the replenishment processing of the coin transport cassette 30 and the drawer 40 with the coin C is completed, the control unit 248 controls the coin transport cassette 30 such that the second reception port 322 of the coin transport cassette 30 is closed.

The control unit 248 controls the opening and closing motor of the reception port opening and closing unit 323 of the coin transport cassette 30 to cause the reception port blocking member 323A to move, thereby closing the first reception port 321 and the second reception port 322 simultaneously.

Thereafter, a clerk draws the drawer portion 234A onto a side of the clerk, and detaches the coin transport cassette 30 and the drawer 40 from the second coin handling apparatus 23.

[Replenishment Processing of Coin from Coin Transport Cassette in First Coin Handling Apparatus]

Next, as operation of the money handling system 1, the replenishment processing of the coin C from the coin transport cassette 30 in the first coin handling apparatus 13 will be described. Note that, processing similar to the processing with the second coin handling apparatus 23 described above will be briefly described.

A clerk opens the cover 131D of the housing 131 of the first coin handling apparatus 13, and attaches the coin transport cassette 30 replenished with the coin C to the cassette attachment unit 134 as illustrated in FIG. 6. When the coin transport cassette 30 is attached to the cassette attachment unit 134, the first coin handling apparatus 13 begins to supply power to the coin transport cassette 30 via the connector of the cassette attachment unit 134. The control unit 141 of the first coin handling apparatus 13 controls the coin transport cassette 30 such that the discharge port 341 of the coin transport cassette 30 opens to discharge the coin C stored in the storage unit 33.

When a required amount of the coin C stored in the storage unit 33 is discharged, the control unit 141 controls the coin transport cassette 30 such that the rotation of the transport belt 351C is ended and that the discharge port 341 is closed.

On the other hand, the coin C fed out of the coin transport cassette 30 falls into the dispensing transport unit 140. The control unit 141 of the first coin handling apparatus 13 controls the dispensing transport unit 140 such that the coin C fed out of the coin transport cassette 30 is transported to the feeding unit 136. The control unit 141 controls the feeding unit 136 and the depositing transport unit 137 such that the coin C fed out of the feeding unit 136 is fed out one by one and transported. The coin C that is transported is subjected to recognition of denomination by the recognition unit 138. The control unit 141 controls the depositing transport unit 137 and the gates of the chutes 139 based on a recognition result by the recognition unit 138 such that the coin C is stored in the storage units 135A to 135H for each denomination.

After the replenishment processing of the required amount of the coin C stored in the coin transport cassette 30 is completed, a clerk may detach the coin transport cassette 30 from the first coin handling apparatus 13 before the start of settlement processing for a customer, or may cause the first coin handling apparatus 13 to perform settlement processing for a customer while the coin transport cassette 30 is attached to the first coin handling apparatus 13.

[Collection Processing of Coin to Coin Transport Cassette in First Coin Handling Apparatus]

Next, as operation of the money handling system 1, collection processing of the coin C to the coin transport cassette 30 in the first coin handling apparatus 13 will be described. Note that, processing similar to the processing with the second coin handling apparatus 23 described above will be briefly described.

In a state in which the coin transport cassette 30 is attached to the cassette attachment unit 134, the control unit 141 of the first coin handling apparatus 13 controls the coin transport cassette 30 such that the first reception port 321 of the coin transport cassette 30 is opened.

The coin transport cassette 30 opens the first reception port 321 and the second reception port 322 simultaneously by control of the control unit 141.

When the first reception port 321 and the second reception port 322 of the coin transport cassette 30 are opened, the control unit 141 causes the coin C stored in the storage units 135A to 135H to be collected by the coin transport cassette 30.

The control unit 141 controls the storage units 135A to 135H and the dispensing transport unit 140 such that the coin C fed out of the storage units 135A to 135H is transported to the feeding unit 136. The control unit 141 controls the feeding unit 136, the depositing transport unit 137 and the gates such that the coin C is collected to the coin transport cassette 30 via the first reception port 321.

When the collection processing of the coin C to the coin transport cassette 30 is completed, the control unit 141 controls the coin transport cassette 30 such that the first reception port 321 of the coin transport cassette 30 is closed.

The coin transport cassette 30 closes the first reception port 321 and the second reception port 322 simultaneously by control of the control unit 141. Thereafter, a clerk detaches the coin transport cassette 30 from the first coin handling apparatus 13.

Working Effect of Embodiment

The second coin handling apparatus 23 comprises the drawer attachment unit 234C; the first cassette attachment unit 234B which is provided at a position different from a position of the drawer attachment unit 234C and the coin transport cassette 30 is attachable to the first cassette attachment unit 234B when the drawer 40 is attached to the drawer attachment unit 234C; the first route 245R that guides the coin C fed out of the storage unit 238 to the drawer 40 attached to the drawer attachment unit 234C; the second route 246R that guides the coin C fed out of the storage unit 238 to the coin transport cassette 30 attached to the first cassette attachment unit 234B; and the switching unit 50 that switches the guide destination of the coin C fed out of the storage unit 238 to the first route 245R or the second route 246R. Thus, after the coin C is stored in the drawer 40, the coin C can be stored in the coin transport cassette 30 without detaching the drawer 40 from the second coin handling apparatus 23. Further, when the coin C is being stored in the drawer 40, the coin transport cassette 30 can be allowed to be attached to the first cassette attachment unit 234B, and the storage of the coin C in the coin transport cassette 30 can be immediately started after the coin C is stored in the drawer 40. Accordingly, time for replenishing the coin transport cassette 30 and the drawer 40 with the coin C can be reduced.

The first route forming portion 245 guides the coin C to the drawer 40 by the drawer chutes 245A to 245H. Thus, the coin C can be guided to the drawer 40 with a simple configuration.

The second route forming portion 246 comprises the transport belt 246D that guides the coin C to the coin transport cassette 30. Thus, the coin C can be transported in a horizontal direction by the transport belt 246D to be guided to the coin transport cassette 30, and it is possible to restrain the second coin handling apparatus 23 from becoming high.

The second route forming portion 246 comprises the cassette chute 246A that guides the coin C onto the transport belt 246D. Thus, the coin C fed out of the storage unit 238 can be surely guided onto the transport belt 246D.

The switching mechanisms 53A to 53H that form the switching unit 50 each comprise the fixing member 531 and the blocking member 532. The fixing member 531 comprises the first opening 531E capable of discharging the coin C to the first route 245R, and the second opening 531F capable of discharging the coin C to the second route 246R.

The blocking member 532 is configured to be capable of blocking the second opening 531F in a case where the coin C fed out of the storage unit 238 is guided to the first route 245R, and to be capable of blocking the first opening 531E in a case where the coin C fed out of the storage unit 238 is guided to the second route 246R. Thus, it is possible to control the guide destination of the coin C with a simple configuration in which the blocking member 532 is only moved with respect to the fixing member 531.

The fixing member 531 comprises the attitude defining portion 531C that defines the attitude of the coin C such that the coin C moves parallel to the surface Ca. The blocking member 532 is configured to be capable of blocking the second opening 531F or the first opening 531E by moving in the direction intersecting the surface Ca of the coin C that moves by the definition of the attitude defining portion 531C. Thus, in comparison with a configuration in which the second opening 531F or the first opening 531E can be blocked by moving the coin C in the direction intersecting the surface Ca and moving the blocking member 532 in the direction parallel to the surface Ca of the coin C in the fixing member 531, it is possible to reduce the amount of movement of the blocking member 532, and to restrain the size of the switching unit 50 from becoming large.

The blocking member 532 is configured such that the blocking member 532 is capable of blocking the second opening 531F or the first opening 531E by turning around the rotating shaft 533. Thus, in comparison with a mechanism in which the blocking member 532 in its entirety is moved in parallel, it is possible to simplify the configuration.

The one switching control unit 54 of the pair of switching control units 54 moves the blocking members 532 of the switching mechanisms 53A to 53D in the same direction, and the other switching control unit 54 moves the blocking members 532 of the switching mechanisms 53E to 53H in the same direction. Thus, it is possible to control the movement of all the blocking members 532 by using the switching control units 54 whose number is fewer than the number of the blocking members 532.

Variations of Embodiment

It goes without saying that the present disclosure is not limited to those indicated in the embodiment described thus far, and various modifications can be made without departing from the spirit of the present disclosure. The embodiment described above and variations that are indicated below may be combined in any way as long as they are applicable.

<Variation 1>

Figure 18A:
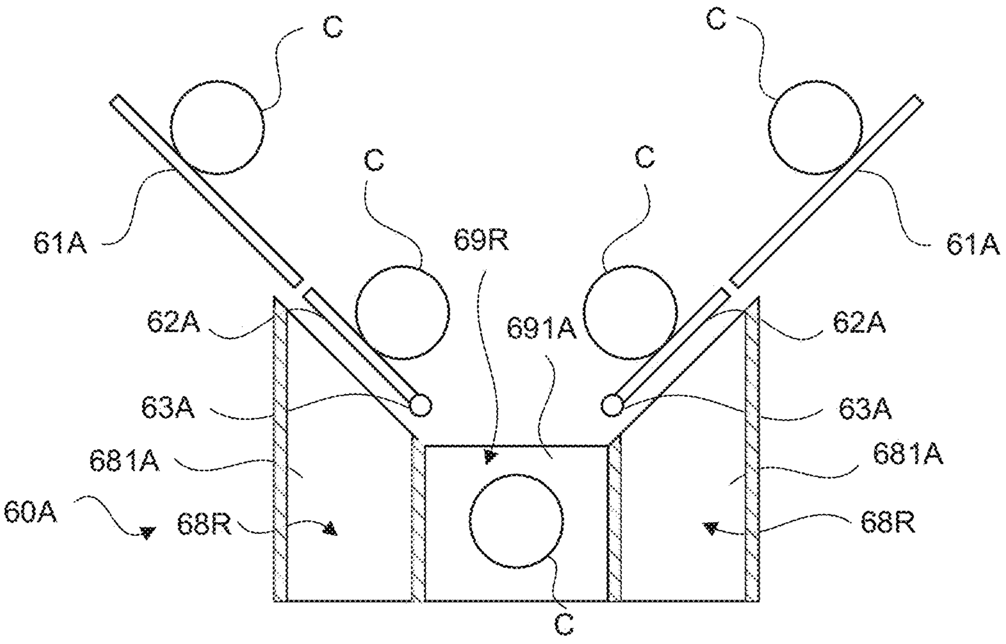
FIG. 18A is a schematic diagram illustrating a schematic configuration of a switching unit of Variation 1 of the present disclosure, illustrating a state when the coin transport cassette is replenished with a coin.
Figure 18B:
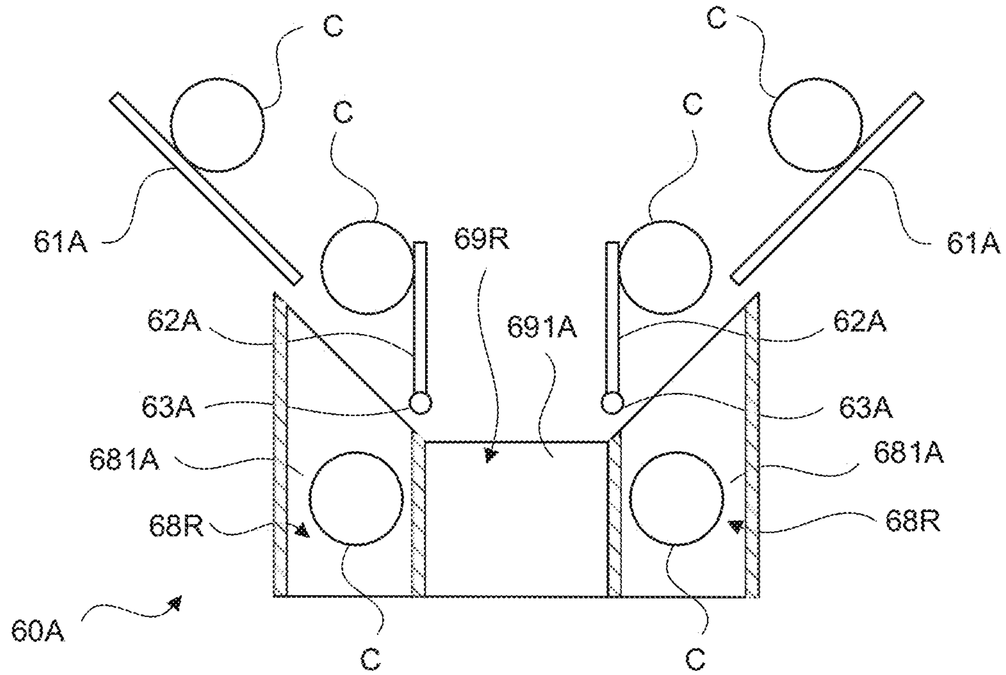
FIG. 18B is a schematic diagram illustrating the schematic configuration of the switching unit of Variation 1 of the present disclosure, illustrating a state when the drawer is replenished with a coin.

First, a switching unit 60A of Variation 1 will be described. FIG. 18A is a schematic diagram illustrating a schematic configuration of a switching unit of Variation 1, illustrating a state when the coin transport cassette is replenished with a coin. FIG. 18B is a schematic diagram illustrating the schematic configuration of the switching unit of Variation 1, illustrating a state when the drawer is replenished with a coin.

The switching unit 60A switches the guide destination of the coin C fed out of a storage unit (not illustrated) to first chutes 681A, which form a pair of first routes 68R that guide the coin C to the drawer 40, or a second chute 691A, which forms a second route 69R that guides the coin C to the coin transport cassette 30. The switching unit 60A comprises a pair of guide members 61A, and a pair of switching plates 62A. The pair of guide members 61A guides the coin C fed out of the storage unit to above the pair of first chutes 681A. Each of the pair of switching plates 62A is provided so as to be turnable around a rotating shaft 63A provided upward from the first chute 681A.

In a case where the coin C is guided to the second route 69R, the switching unit 60A controls a driving unit (not illustrated) such that the pair of switching plates 62A is turned so as to block upper ends of the respective first chutes 681A and so as not to block an upper end of the second chute 691A as illustrated in FIG. 18A. By this turning, the coin C guided by the guide members 61A is guided not to the first routes 68R, but to the second route 69R.

In a case where the coin C is guided to the first routes 68R, the switching unit 60A causes the pair of switching plates 62A to be turned such that the pair of switching plates 62A does not block the upper ends of each of the first chutes 681A and that surfaces of the switching plates 62A become substantially parallel to the vertical direction as illustrated in FIG. 18B. By this turning, the coin C guided by the guide members 61A is guided not to the second route 69R, but to the first routes 68R. Note that, in a case where the coin C is guided to the first routes 68R, the switching unit 60A may also cause the pair of switching plates 62A to be turned such that the surfaces of the switching plates 62A do not become substantially parallel to the vertical direction. For example, the switching unit 60A may cause the switching plates 62A to be turned such that end portions of the switching plates 62A on sides opposite to end portions provided with the rotating shafts 63A come into contact with each other or approach each other.

<Variation 2>

Figure 19A:
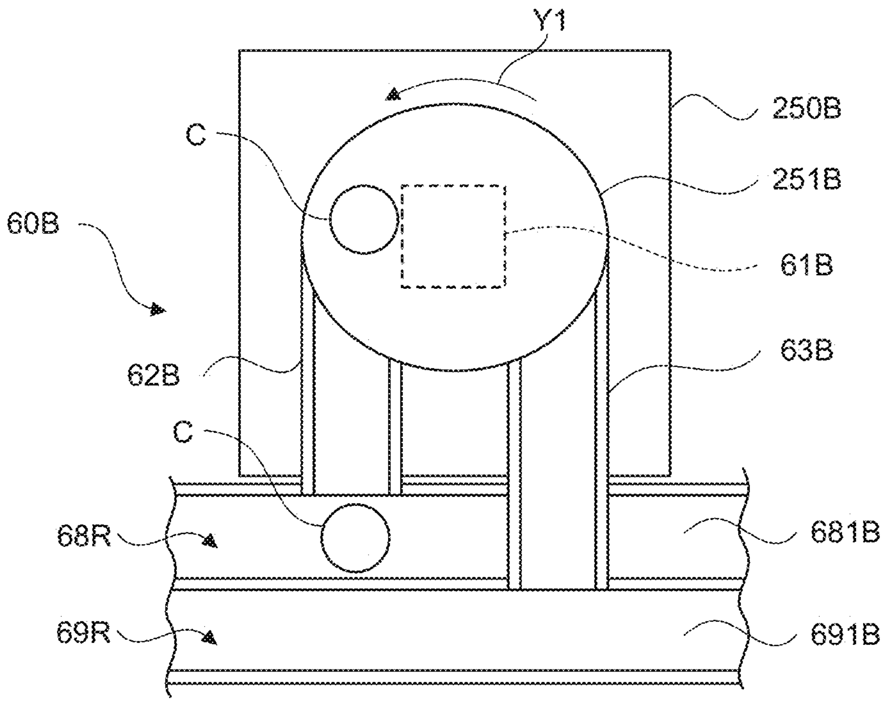
FIG. 19A is a schematic diagram illustrating a schematic configuration of a switching unit of Variation 2 of the present disclosure, illustrating a state when the drawer is replenished with a coin.
Figure 19B:
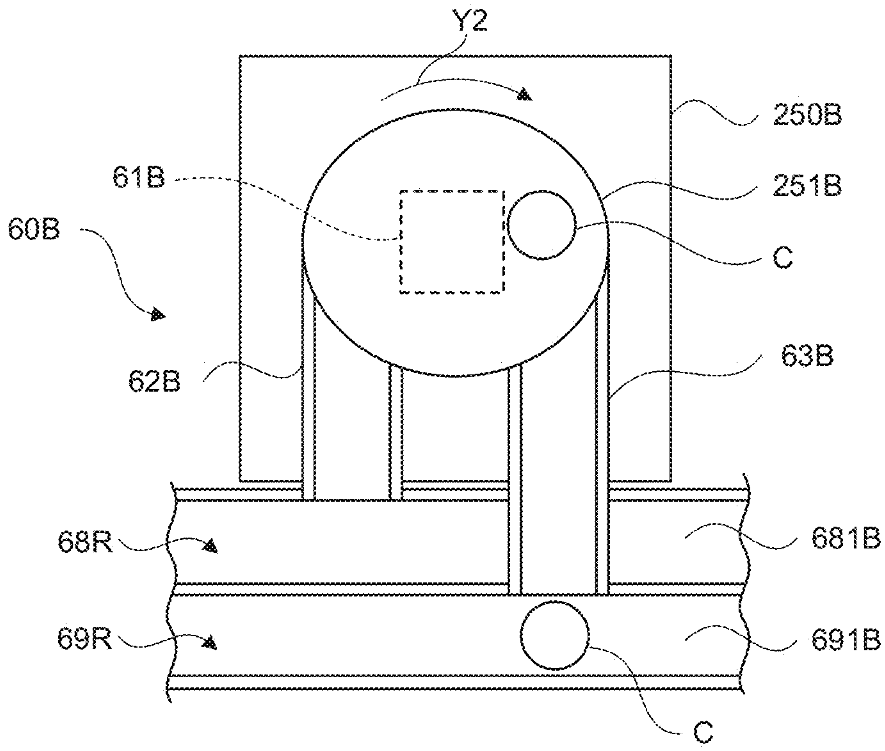
FIG. 19B is a schematic diagram illustrating the schematic configuration of the switching unit of Variation 2 of the present disclosure, illustrating a state when the coin transport cassette is replenished with a coin.

Next, a switching unit 60B of Variation 2 will be described. FIG. 19A is a schematic diagram illustrating a schematic configuration of a switching unit of Variation 2, illustrating a state when the drawer is replenished with a coin. FIG. 19B is a schematic diagram illustrating the schematic configuration of the switching unit of Variation 2, illustrating a state when the coin transport cassette is replenished with a coin.

An inclined disk 251B is provided in a storage unit 250B. The inclined disk 251B rotates in an inclined state in the same manner as the feeding mechanism provided in the storage units 135A to 135H, and picks up the coin C one by one by a plurality of projection members on an outer area of a surface of the inclined disk 251B and feeds out the coin C. The switching unit 60B comprises a driving unit 61B, a first coin guide portion 62B, and a second coin guide portion 63B. The driving unit 61B rotates the inclined disk 251B. The first coin guide portion 62B guides the coin C fed out of the inclined disk 251B to the first route 68R formed of a first route forming portion 681B. The second coin guide portion 63B guides the coin C fed out of the inclined disk 251B to the second route 69R formed of a second route forming portion 691B. The first route forming portion 681B and the second route forming portion 691B are each formed of chutes, a transport belt, and the like that are capable of guiding the coin C to the drawer 40 and the coin transport cassette 30, respectively.

In a case where the coin C is guided to the drawer 40, the switching unit 60B controls the driving unit 61B such that the inclined disk 251B is rotated in the counterclockwise direction (to the left) as indicated by an arrow Y1 in FIG. 19A to guide the coin C in the storage unit 250B to the first route 68R via the first coin guide portion 62B. In a case where the coin C is guided to the coin transport cassette 30, the switching unit 60B controls the driving unit 61B such that the inclined disk 251B is rotated in the clockwise direction (to the right) as indicated by an arrow Y2 in FIG.

19B to guide the coin C in the storage unit 250B to the second route 69R via the second coin guide portion 63B. Thus, the switching unit 60B causes the inclined disk 251B to function as a first feeding unit and a second feeding unit, thereby guiding the coin C in the storage unit 250B to the first route 68R or the second route 69R.

Note that, the switching unit 60B of Variation 2 may also be configured as follows. A connection portion between the inclined disk 251B and the first coin guide portion 62B and a connection portion between the inclined disk 251B and the second coin guide portion 63B are provided with a gate, respectively. The switching unit 60B may cause the coin C to be guided to the first route 68R or the second route 69R by opening one of the two gates while causing the inclined disk 251B to be rotated. In this case, the driving unit 61B may be configured to cause the inclined disk 251B to be rotated in both the directions of the arrow Y1 and the arrow Y2 or may be configured to cause the inclined disk 251B to be rotated in only one direction thereof.

<Variation 3>

Figure 20A:
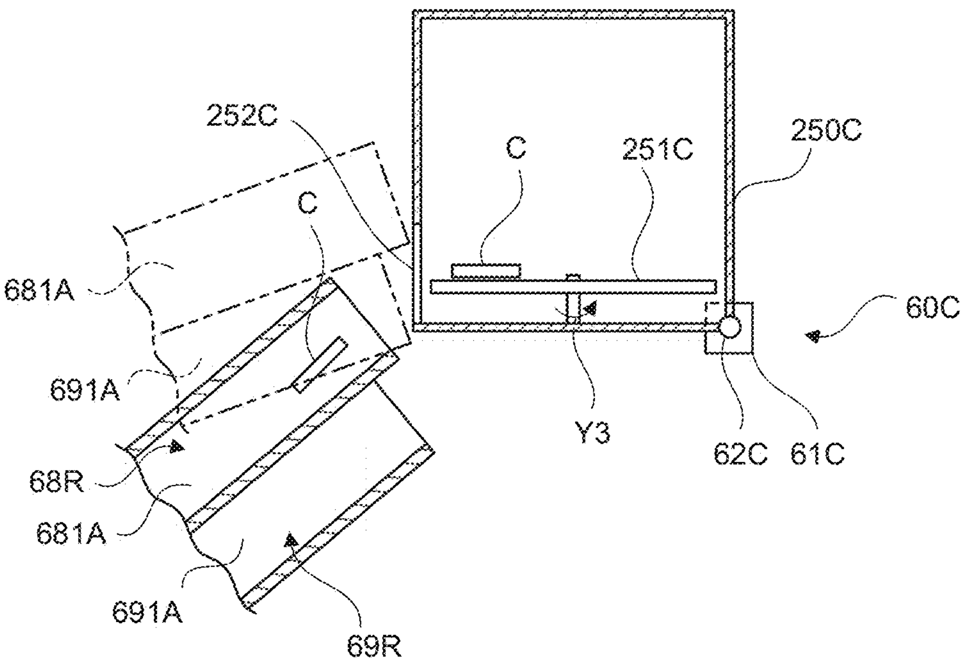
FIG. 20A is a schematic diagram illustrating a schematic configuration of a switching unit of Variation 3 of the present disclosure, illustrating a state when the drawer is replenished with a coin.
Figure 20B:
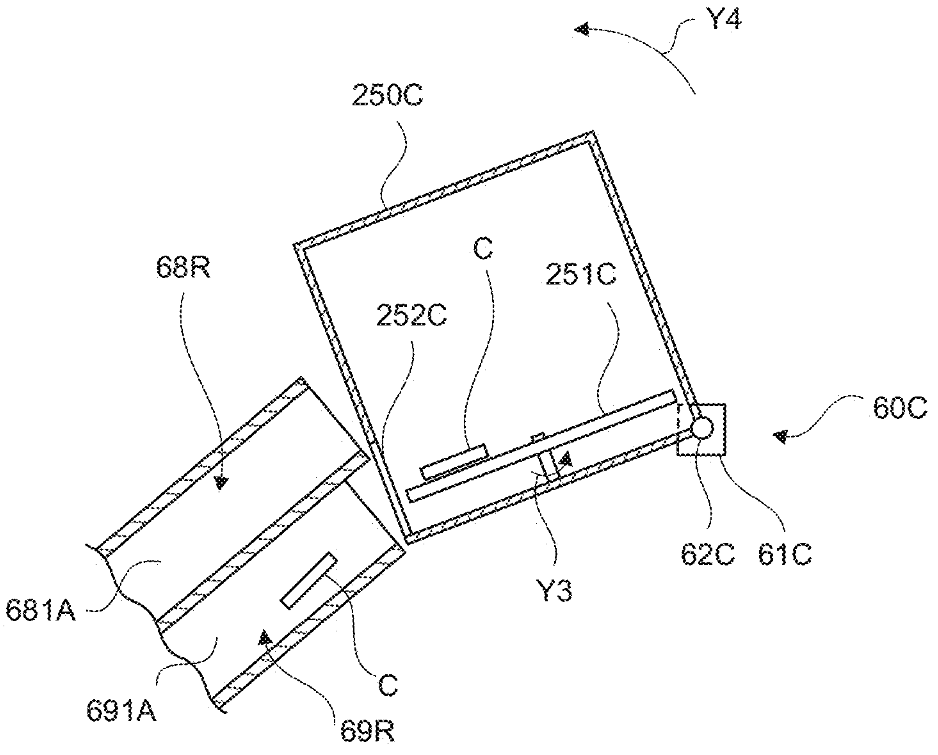
FIG. 20B is a schematic diagram illustrating the schematic configuration of the switching unit of Variation 3 of the present disclosure, illustrating a state when the coin transport cassette is replenished with a coin.

Next, a switching unit 60C of Variation 3 will be described. FIG. 20A is a schematic diagram illustrating a schematic configuration of a switching unit of Variation 3, illustrating a state when the drawer is replenished with a coin. FIG. 20B is a schematic diagram illustrating the schematic configuration of the switching unit of Variation 3, illustrating a state when the coin transport cassette is replenished with a coin. Note that, the same configurations as in Variation 1 are denoted by the same reference signs, and detailed descriptions thereof will be omitted.

A horizontal disk 251C is provided in a storage unit 250 C. The horizontal disk 251C rotates in a direction indicated by an arrow Y3 in a state in which the surface of the disk coincides with the horizontal direction, and feeds out the coin C one by one from a discharge port 252C of the storage unit 250C by centrifugal force with a plurality of projection members on an outer area of a surface of the horizontal disk 251C. The switching unit 60C comprises a driving unit 61C. The driving unit 61C is an example of a first driving unit, and turns the storage unit 250C around a rotating shaft 62C.

In a case where the coin C is guided to the drawer 40, the switching unit 60C causes the horizontal disk 251C to be rotated in a state in which the discharge port 252C faces an entrance of the first route 68R, thereby feeding out the coin C in the storage unit 250C and guiding the coin C to the first route 68R as illustrated in FIG. 20A. In a case where the coin C is guided to the coin transport cassette 30, the switching unit 60C controls the driving unit 61C such that the storage unit 250C is rotated in a direction indicated by an arrow Y4 in FIG. 20B to move the discharge port 252C to a position facing an entrance of the second route 69R. The switching unit 60C guides the coin C in the storage unit 250C to the second route 69R by rotating the horizontal disk 251C.

Note that, in order to cause the discharge port 252C to face the entrance of the first route 68R or the entrance of the second route 69R, the switching unit 60C of Variation 3 may also be configured as follows. The switching unit 60C may move the storage unit 250C in the up-down direction in FIG. 20A and FIG. 20B. The switching unit 60C may move the first chute 681A and the second chute 691A in the up-down direction in FIG. 20A and FIG. 20B. As indicated by a two-dot chain line in FIG. 20A, the switching unit 60C may turn the first chute 681A and the second chute 691A.

<Variation 4>

Figure 21A:
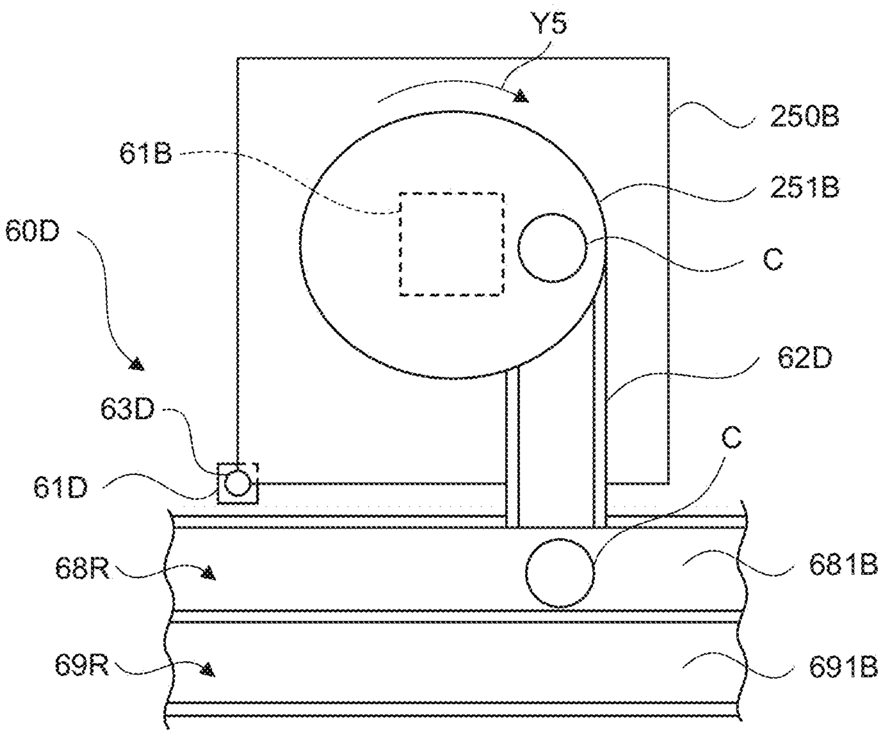
FIG. 21A is a schematic diagram illustrating a schematic configuration of a switching unit of Variation 4 of the present disclosure, illustrating a state when the drawer is replenished with a coin.
Figure 21B:
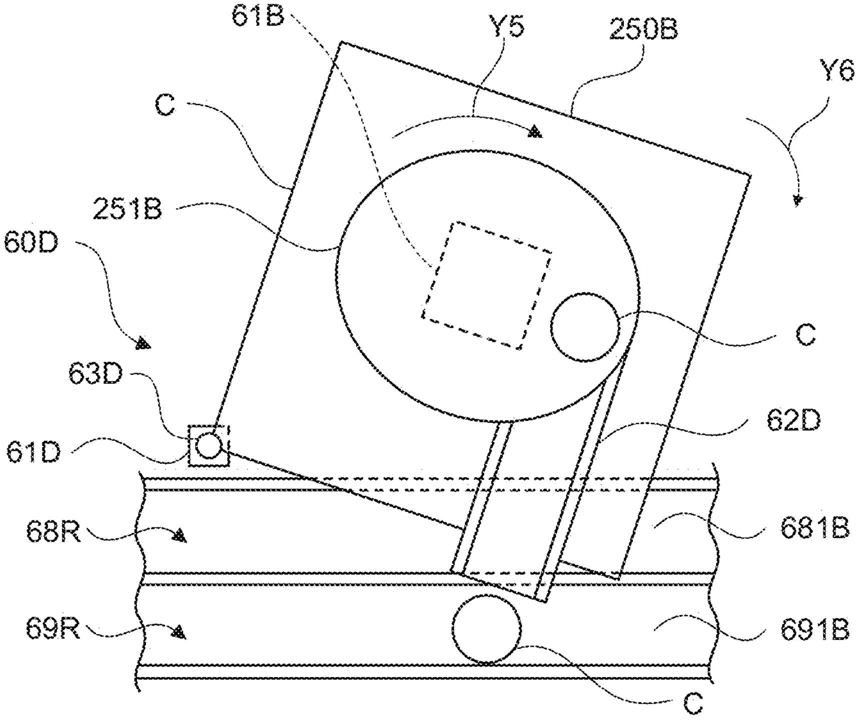
FIG. 21B is a schematic diagram illustrating the schematic configuration of the switching unit of Variation 4 of the present disclosure, illustrating a state when the coin transport cassette is replenished with a coin.

Next, a switching unit 60D of Variation 4 will be described. FIG. 21A is a schematic diagram illustrating a schematic configuration of a switching unit of Variation 4, illustrating a state when the drawer is replenished with a coin. FIG. 21B is a schematic diagram illustrating the schematic configuration of the switching unit of Variation 4, illustrating a state when the coin transport cassette is replenished with a coin. Note that, the same configurations as in Variation 2 are denoted by the same reference signs, and detailed descriptions thereof will be omitted.

The switching unit 60D comprises a driving unit 61D, and a coin guide portion 62D. The driving unit 61D is an example of the first driving unit, and turns the storage unit 250B around a rotating shaft 63D. The coin guide portion 62D guides the coin C fed out of the inclined disk 251B to the first route 68R or the second route 69R.

In a case where the coin C is guided to the drawer 40, the switching unit 60D controls the driving unit 61B such that the inclined disk 251B rotates in the clockwise direction (to the right) as indicated by an arrow Y5 in FIG. 21A to guide the coin C in the storage unit 250B to the first route 68R via the coin guide portion 62D. In a case where the coin C is guided to the coin transport cassette 30, the switching unit 60D controls the driving unit 61D such that the storage unit 250B and the coin guide portion 62D are turned in a direction indicated by an arrow Y6 in FIG. 21B. The switching unit 60D guides the coin C in the storage unit 250B to the second route 69R via the coin guide portion 62D by rotating the inclined disk 251B.

<Variation 5>

Figure 22A:
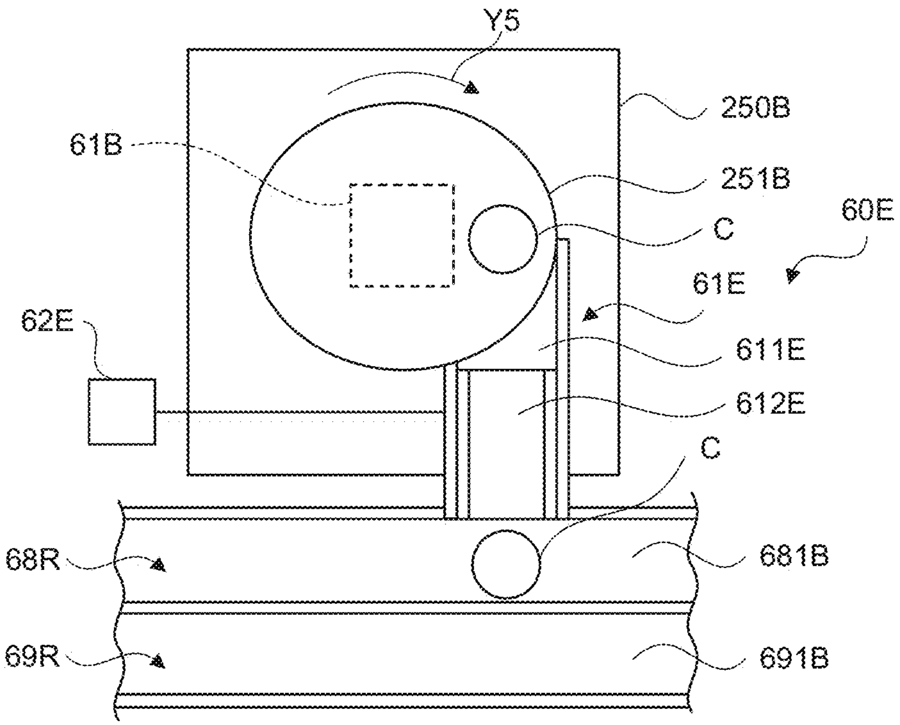
FIG. 22A is a schematic diagram illustrating a schematic configuration of a switching unit of Variation 5 of the present disclosure, illustrating a state when the drawer is replenished with a coin.
Figure 22B:
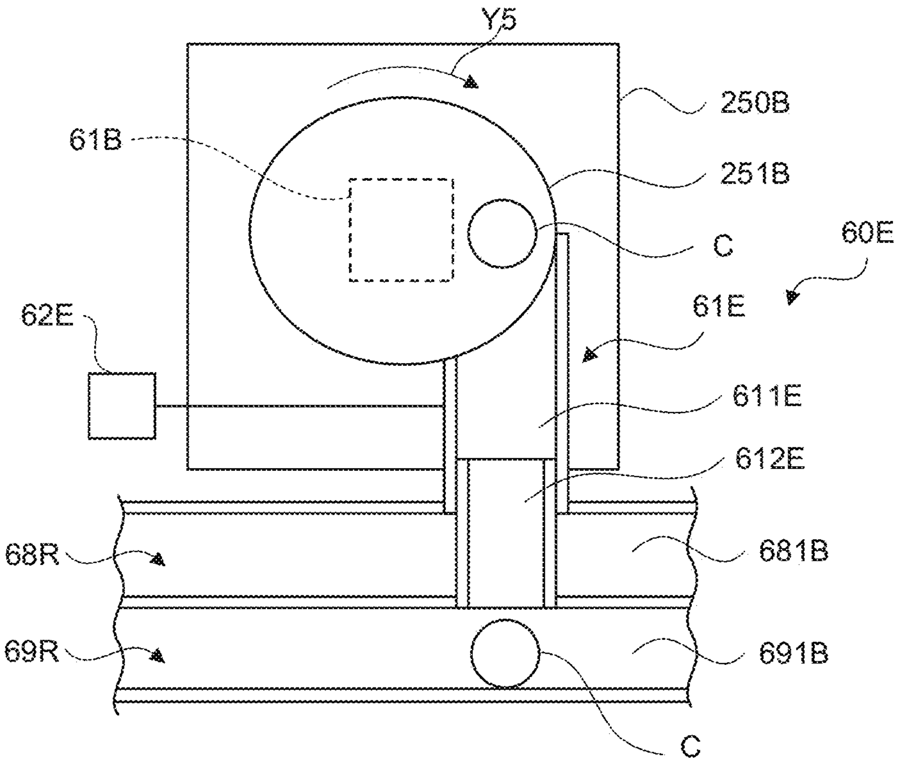
FIG. 22B is a schematic diagram illustrating the schematic configuration of the switching unit of Variation 5 of the present disclosure, illustrating a state when the coin transport cassette is replenished with a coin.

Next, a switching unit 60E of Variation 5 will be described. FIG. 22A is a schematic diagram illustrating a schematic configuration of a switching unit of Variation 5, illustrating a state when the drawer is replenished with a coin. FIG. 22B is a schematic diagram illustrating the schematic configuration of the switching unit of Variation 5, illustrating a state when the coin transport cassette is replenished with a coin. Note that, the same configurations as in Variation 4 are denoted by the same reference signs, and detailed descriptions thereof will be omitted.

The switching unit 60E comprises an extension and retraction portion 61E, and a driving unit 62E. The extension and retraction portion 61E is connected to the first route forming portion 681B forming the first route 68R or the second route forming portion 691B forming the second route 69R by extension and retraction. The extension and retraction portion 61E comprises a fixed guide portion 611E fixed to the storage unit 250B, and a movement guide portion 612E that moves with respect to the fixed guide portion 611E. The driving unit 62E is an example of a second driving unit, and causes the extension and retraction portion 61E to extend and retract by moving the movement guide portion 612E with respect to the fixed guide portion 611E.

In a case where the coin C is guided to the drawer 40, the switching unit 60E controls the driving unit 62E such that the extension and retraction portion 61E is connected to the first route forming portion 681B as illustrated in FIG. 22A. The switching unit 60E controls the driving unit 61B such that the inclined disk 251B is rotated as indicated by the arrow Y5 in FIG. 22A, thereby guiding the coin C in the storage unit 250B to the first route 68R via the extension and retraction portion 61E connected to the first route forming portion 681B. In a case where the coin C is guided to the coin transport cassette 30, the switching unit 60E controls the driving unit 62E such that the movement guide portion 612E is moved to connect the extension and retraction portion 61E to the second route forming portion 691B as illustrated in FIG. 22B. The switching unit 60E guides the coin C in the storage unit 250B to the second route 69R via the extension and retraction portion 61E by rotating the inclined disk 251B.

<Variation 6>

Figure 23A:
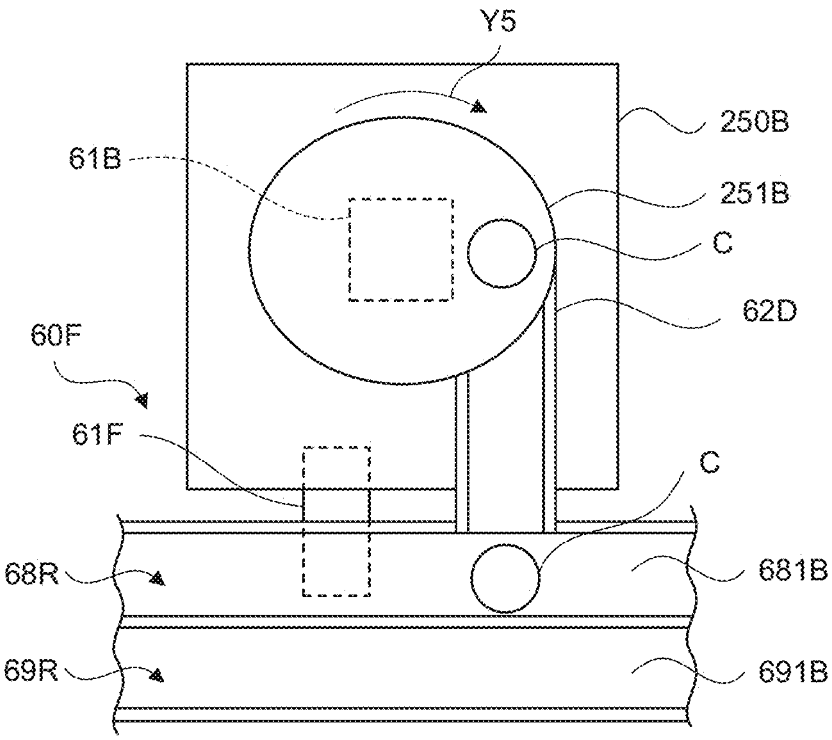
FIG. 23A is a schematic diagram illustrating a schematic configuration of a switching unit of Variation 6 of the present disclosure, illustrating a state when the drawer is replenished with a coin.
Figure 23B:
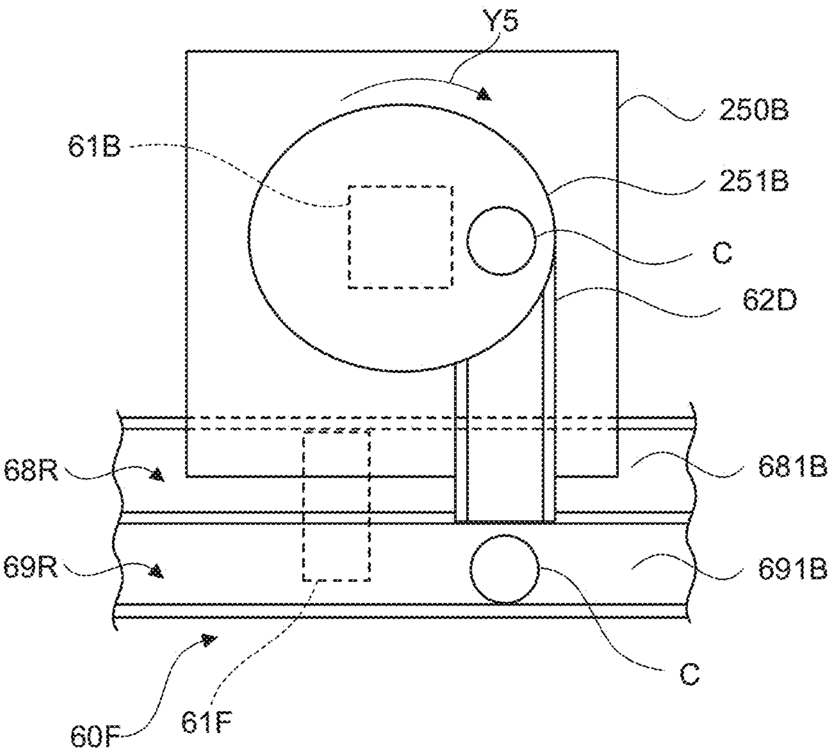
FIG. 23B is a schematic diagram illustrating the schematic configuration of the switching unit of Variation 6 of the present disclosure, illustrating a state when the coin transport cassette is replenished with a coin.

Next, a switching unit 60F of Variation 6 will be described. FIG. 23A is a schematic diagram illustrating a schematic configuration of a switching unit of Variation 6, illustrating a state when the drawer is replenished with a coin. FIG. 23B is a schematic diagram illustrating the schematic configuration of the switching unit of Variation 6, illustrating a state when the coin transport cassette is replenished with a coin. Note that, the same configurations as in Variation 4 are denoted by the same reference signs, and detailed descriptions thereof will be omitted.

The switching unit 60F comprises a driving unit 61F. The driving unit 61F is an example of a third driving unit, and moves the first route forming portion 681B and the second route forming portion 691B in a direction approaching the storage unit 250B and in a direction away from the storage unit 250B.

In a case where the coin C is guided to the drawer 40, the switching unit 60F controls the driving unit 61F to realize a state in which the coin C can be guided to the first route 68R by the coin guide portion 62D as illustrated in FIG. 23A. The switching unit 60F causes the inclined disk 251B to be rotated such that the coin C in the storage unit 250B is guided to the first route 68R via the coin guide portion 62D. In a case where the coin C is guided to the coin transport cassette 30, the switching unit 60F controls the driving unit 61F such that the first route forming portion 681B and the second route forming portion 691B are moved to realize a state in which the coin C can be guided to the second route 69R by the coin guide portion 62D as illustrated in FIG. 23B. The switching unit 60F causes the inclined disk 251B to be rotated, thereby guiding the coin C in the storage unit 250B to the second route 69R via the coin guide portion 62D.

Note that, the switching unit 60F of Variation 6 may also be configured as follows. The switching unit 60F may move the storage unit 250B in the up-down direction in FIG. 23A and FIG. 23B, or may move the storage unit 250B, the first route forming portion 681B, and the second route forming portion 691B in the up-down direction in FIG. 23A and FIG. 23B.

<Variation 7>

Figure 24A:
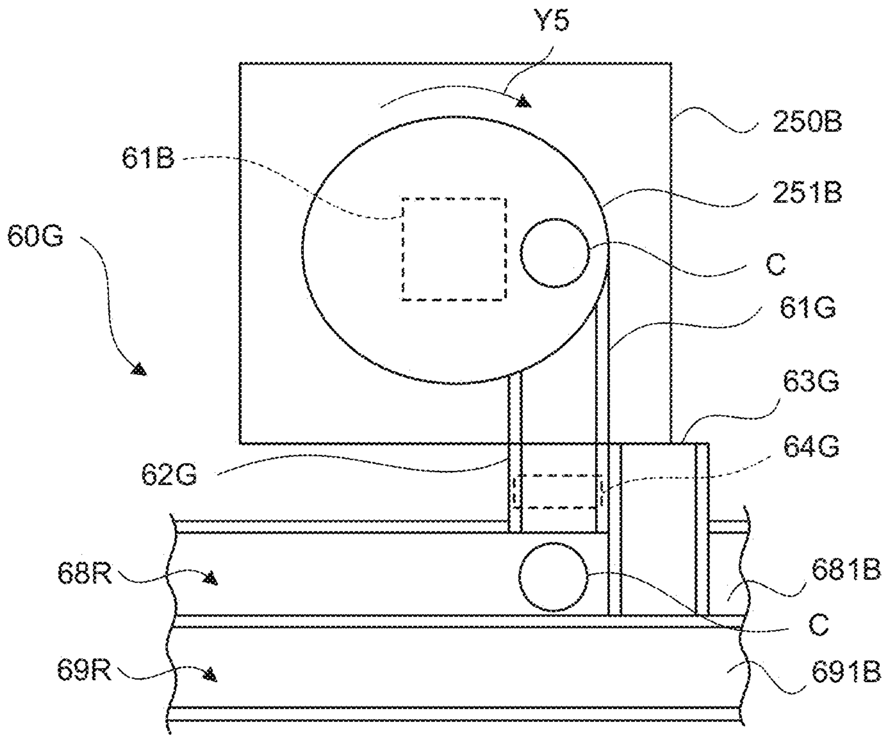
FIG. 24A is a schematic diagram illustrating a schematic configuration of a switching unit of Variation 7 of the present disclosure, illustrating a state when the drawer is replenished with a coin.
Figure 24B:
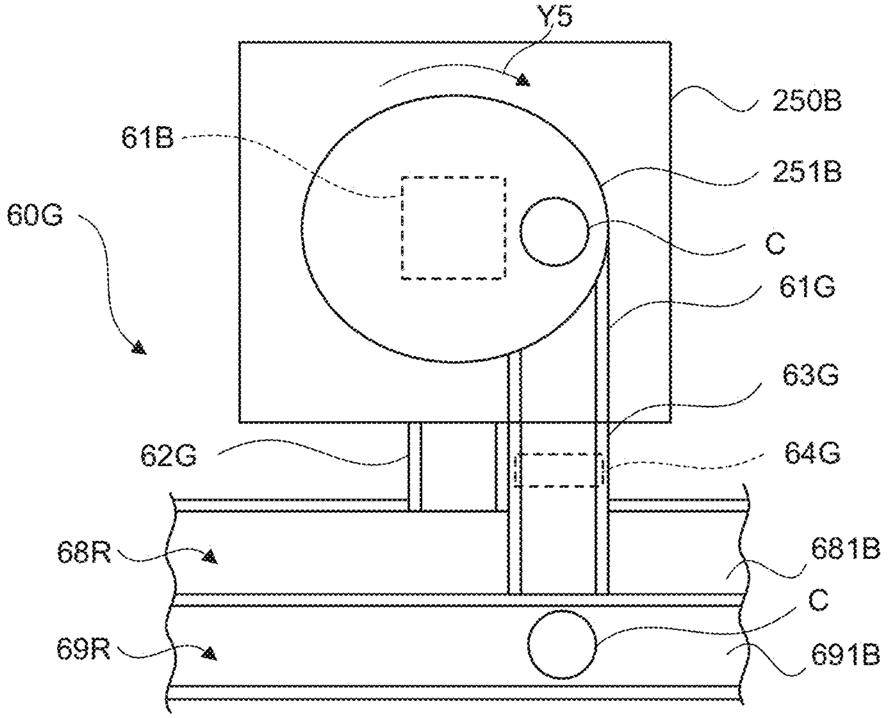
FIG. 24B is a schematic diagram illustrating the schematic configuration of the switching unit of Variation 7 of the present disclosure, illustrating a state when the coin transport cassette is replenished with a coin.

Next, a switching unit 60G of Variation 7 will be described. FIG. 24A is a schematic diagram illustrating a schematic configuration of a switching unit of Variation 7, illustrating a state when the drawer is replenished with a coin. FIG. 24B is a schematic diagram illustrating the schematic configuration of the switching unit of Variation 7, illustrating a state when the coin transport cassette is replenished with a coin. Note that, the same configurations as in Variation 2 are denoted by the same reference signs, and detailed descriptions thereof will be omitted.

The switching unit 60G comprises a coin guide portion 61G, a first movable guide portion 62G, a second movable guide portion 63G, and a driving unit 64G. The coin guide portion 61G is fixed to the storage unit 250B, and guides the coin C fed out of the inclined disk 251B to the first movable guide portion 62G or the second movable guide portion 63G. The first movable guide portion 62G guides the coin C guided by the coin guide portion 61G to the first route 68R. The second movable guide portion 63G guides the coin C guided by the coin guide portion 61G to the second route 69R. The driving unit 64G moves the first movable guide portion 62G and the second movable guide portion 63G in the left-right direction in FIG. 24A and FIG. 24B.

In a case where the coin C is guided to the drawer 40, the switching unit 60G controls the driving unit 64G such that the first movable guide portion 62G is connected to the coin guide portion 61G to realize a state in which the coin C can be guided to the first route 68R as illustrated in FIG. 24A. The switching unit 60G causes the inclined disk 251B to be rotated such that the coin C in the storage unit 250B is guided to the first route 68R via the coin guide portion 61G and the first movable guide portion 62G. In a case where the coin C is guided to the coin transport cassette 30, the switching unit 60G controls the driving unit 64G such that the second movable guide portion 63G is connected to the coin guide portion 61G to realize a state in which the coin C can be guided to the second route 69R as illustrated in FIG. 24B. The switching unit 60G causes the inclined disk 251B to be rotated such that the coin C in the storage unit 250B is guided to the second route 69R via the coin guide portion 61G and the second movable guide portion 63G.

<Variation 8>

Figure 25A:
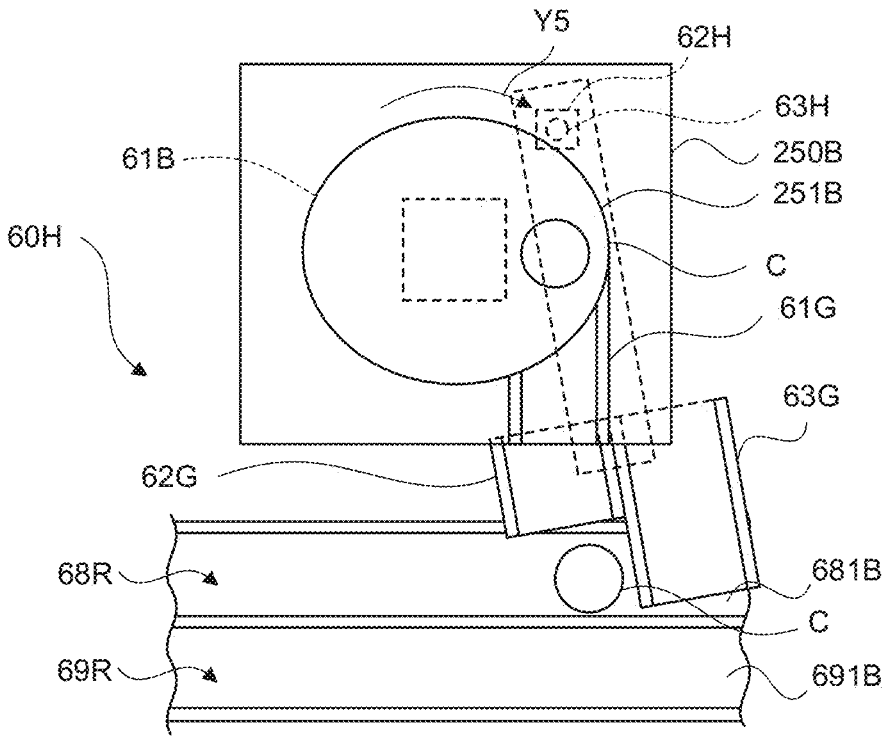
FIG. 25A is a schematic diagram illustrating a schematic configuration of a switching unit of Variation 8 of the present disclosure, illustrating a state when the drawer is replenished with a coin.
Figure 25B:
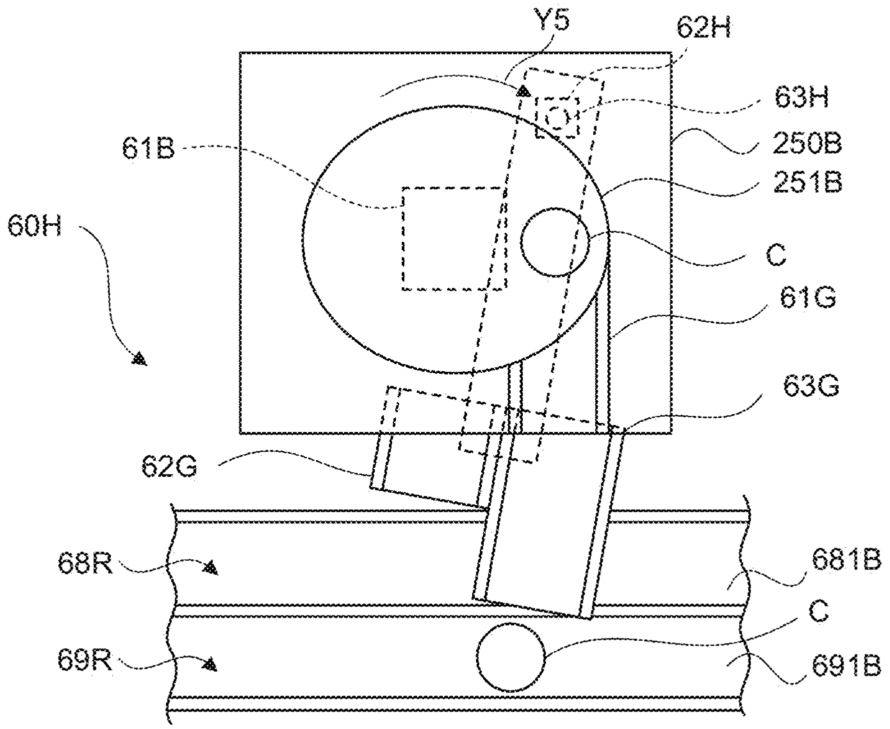
FIG. 25B is a schematic diagram illustrating the schematic configuration of the switching unit of Variation 8 of the present disclosure, illustrating a state when the coin transport cassette is replenished with a coin.

Next, a switching unit 60H of Variation 8 will be described. FIG. 25A is a schematic diagram illustrating a schematic configuration of a switching unit of Variation 8, illustrating a state when the drawer is replenished with a coin. FIG. 25B is a schematic diagram illustrating the schematic configuration of the switching unit of Variation 8, illustrating a state when the coin transport cassette is replenished with a coin. Note that, the same configurations as in Variation 7 are denoted by the same reference signs, and detailed descriptions thereof will be omitted.

The switching unit 60H comprises a connection member 61H, and a driving unit 62H. The first movable guide portion 62G and the second movable guide portion 63G are fixed onto a side of one end of the connection member 61H. A side of the other end of the connection member 61H is fixed to a rotating shaft 63H of the driving unit 62H. The driving unit 62H turns the first movable guide portion 62G and the second movable guide portion 63G around the rotating shaft 63H.

In a case where the coin C is guided to the drawer 40, the switching unit 60H controls the driving unit 62H such that the first movable guide portion 62G is located below an exit of the coin guide portion 61G to realize a state in which the coin C can be guided to the first route 68R as illustrated in FIG. 25A. The switching unit 60H causes the inclined disk 251B to be rotated such that the coin C in the storage unit 250B is guided to the first route 68R via the coin guide portion 61G and the first movable guide portion 62G. In a case where the coin C is guided to the coin transport cassette 30, the switching unit 60H controls the driving unit 62H such that the second movable guide portion 63G is located below the exit of the coin guide portion 61G to realize a state in which the coin C can be guided to the second route 69R as illustrated in FIG. 25B. The switching unit 60H causes the inclined disk 251B to be rotated such that the coin C in the storage unit 250B is guided to the second route 69R via the coin guide portion 61G and the second movable guide portion 63G.

<Other Variations>

It may also be configured such that the blocking members 532 of the switching mechanisms 53A to 53D are moved in the same direction by controlling the switching control unit 54, thereby guiding the coin C to the first route 245R via the switching mechanisms 53A and 53B or guiding the coin C to the second route 246R via the switching mechanisms 53C and 53D, for example.

It may also be configured such that after the coin C fed out of the storage boxes 238A to 238D is guided to the first route 245R and the coin C fed out of the storage boxes 238E to 238H is guided to the second route 246R, the coin C fed out of the storage boxes 238A to 238D is guided to the second route 246R and the coin C fed out of the storage boxes 238E to 238H is guided to the first route 245R.

It may also be configured such that the switching mechanisms 53A to 53H are controlled and the guide destination of the coin C is switched to the first route 245R or the second route 246R based on denominations of the coin C stored in the storage boxes 238A to 238H. For example, it may be configured such that the guide destination of the coin C fed out of the storage box 238A is switched to the first route 245R or the second route 246R by the switching mechanism 53A, and that the guide destination of the coin C fed out of the storage box 238B that stores the coin C of a denomination different from that of the coin C in the storage box 238A is switched to the first route 245R or the second route 246R by the switching mechanism 53B. In this case, the switching mechanisms 53A to 53H may be controlled by different switching control units, respectively, or may be controlled by the same switching control unit.

The switching unit 50 may also be configured such that the coin C of an arbitrary combination of denominations among a plurality of denominations of the coin C stored in the storage boxes 238A to 238H is guided to only the first route 245R, for example, and that the coin C of denominations different from those of the coin C guided to the first route 245R is guided to only the second route 246R.

The number of the blocking members 532 that are connected by the connection member 541 may be two, three, or five or more. Alternatively, each of the blocking members 532 may be individually movable without providing the connection member 541.

The second route 246R may also be formed of a chute and cause the coin C to be guided downward from the storage boxes 238A to 238H with the chute to be stored in the coin transport cassette 30.

The first route forming portion 245 may also be configured such that the coin C is guided to the drawer 40 by the transport belt, in the same manner as the second route forming portion 246.

The second coin handling apparatus 23 may not have the function of depositing the coin C from the coin transport cassette 30 and the drawer 40.

It may also be configured such that the second opening 531F or the first opening 531E can be blocked by moving the coin C in the direction intersecting the surface Ca and moving the blocking member 532 in the direction parallel to the surface Ca of the coin C in the fixing member 531 without providing the attitude defining portion 531C in the fixing member 531.

It may also be configured such that the second opening 531F or the first opening 531E can be blocked by causing the blocking member 532 in its entirety to be moved in parallel (to be slid).

In the embodiment described above and the respective variations described above, the inclined disk or the horizontal disk in the storage unit is not limited to those exemplified in the embodiment described above and the respective variations described above, but may be configured in other ways as long as coins can be fed out one by one thereby.

The disclosure of Japanese Patent Application No. 2020-050821, filed on Mar. 23, 2020, including the specification, drawings and abstract, is incorporated herein by reference in its entirety.

The present disclosure is applicable to a coin handling apparatus.

The invention claimed is:

1. A coin handling apparatus, comprising:
- a storage to store a coin therein and feed out the stored coin therefrom, wherein the storage comprises a plurality of storage boxes;
- a first route to guide the coin fed out from the storage to a first container;
- a second route to guide the coin fed out from the storage to a second container; and
- a switch to switch a guide destination of the coin fed out from the storage between the first route and the second route, wherein
- the first container includes a plurality of compartments,
- the second container includes an opening,
- in a replenishment processing of the first container:
  - the switch switches to the first route which is configured to guide the coin fed out from the plurality of the storage boxes to the first container, separately for each storage box, and
  - the coin fed out from the plurality of the storage boxes is received by the plurality of compartments, and
- in a replenishment processing of the second container:
  - the switch switches to the second route which is configured to guide the coin fed out from the plurality of storage boxes to the second container, and
  - the coin is received by the second container via the opening.

2. The coin handling apparatus according to claim 1, wherein
- the first route comprises a plurality of first chutes provided one by one downward from the plurality of storage boxes, and
- the second route comprises a transporter to transport the coin fed out from the plurality of storage boxes to the second container and further comprises a second chute to guide the coin fed out from the storage to the transporter.

3. The coin handling apparatus according to claim 2, wherein the transporter is a transport belt.

4. The coin handling apparatus according to claim 2, wherein
- the plurality of first chutes comprises a pair of drawer chutes, and
- the second chute comprises a pair of plate-shaped members, a first one of which is provided between one of the drawer chutes and the transporter, and a second one of which is provided between the other of the drawer chutes and the transporter.

5. The coin handling apparatus according to claim 2, wherein the transporter is configured to
- receive plural coins fed out from the plurality of storage boxes onto the transporter, and transport the plural coins to the second container.

6. The coin handling apparatus according to claim 2, wherein each first chute of the plurality of first chutes connects to a corresponding storage box of the plurality of storage boxes and guides coins from the plurality of storage boxes to the first container.

7. The coin handling apparatus according to claim 1, wherein the switch comprises:
- a fixing member having a first opening and a second opening, the first opening through which the coin fed out from the storage is capable of being discharged to the first route, the second opening through which the coin fed out from the storage is capable of being discharged to the second route; and a blocking member to block the second opening in a case where the coin fed out of the storage is guided to the first route, and to block the first opening in a case where the coin fed out of the storage is guided to the second route.

8. The coin handling apparatus according to claim 7, wherein the fixing member further comprises an attitude defining portion to define an attitude of the coin such that the coin moves parallel to a surface of the coin, and the blocking member blocks the second opening or the first opening by moving in a direction intersecting the surface of the coin, the attitude of the coin being defined by the attitude defining portion.

9. The coin handling apparatus according to claim 8, wherein the blocking member blocks the second opening or the first opening by turning around an axis of a rotating shaft.

10. The coin handling apparatus according to claim 1, wherein the switch comprises:

a first switching mechanism to switch a guide destination of a coin fed out from a first storage box to the first route or the second route;

a second switching mechanism to switch a guide destination of a coin fed out of a second storage box to the first route or the second route; and a switching controller configured to switch the first switching mechanism and the second switching mechanism.

11. The coin handling apparatus according to claim 1, wherein the plurality of storage boxes includes:

a first storage box to store a coin therein; and a second storage box to store a coin therein, and the switch comprises:

a first switching mechanism to switch a guide destination of the coin fed out from the first storage box between the first route and the second route; and a second switching mechanism to switch a guide destination of the coin fed out from the second storage box between the first route and the second route.

12. The coin handling apparatus according to claim 11, wherein the switch further comprises:

a first switching controller configured to control the first switching mechanism such that the coin fed out from the first storage box is guided to the first route or the second route; and a second switching controller configured to control the second switching mechanism such that the coin fed out from the second storage box is guided to the first route or the second route.

13. The coin handling apparatus according to claim 1, wherein each storage box of the plurality of storage boxes stores coin of one denomination different from each other, and the switch is configured to switch the guide destination of the coin fed out from the storage such that coins of an arbitrary combination of denominations among a plurality of denominations are guided to the first route or the second route.

14. The coin handling apparatus according to claim 1, wherein the first container is a drawer and the second container is a cassette.

15. The coin handling apparatus according to claim 1, further comprising:

a first attachment to which the first container for transporting a coin between the coin handling apparatus and another apparatus is capable of being attached;

a second attachment to which the second container for transporting a coin between the coin handling apparatus and the another apparatus is capable of being attached; and a drawer portion that is to be drawn from inside of the coin handling apparatus to a front side of the coin handling apparatus, wherein the first attachment and the second attachment are provided in the drawer, and the first container is capable of being attached to the first attachment when the second container is attached to the second attachment.

16. The coin handling apparatus according to claim 15, wherein the first attachment is provided on a rearward side from the second attachment in the drawer portion, and the second attachment is provided in a front-side portion of the drawer portion.

17. The coin handling apparatus according to claim 1, wherein each storage box of the plurality of storage boxes stores coin of one denomination different from each other, and the first route is further configured to guide the coin fed out from the plurality of the storage boxes to the first container for each denomination corresponding to each respective storage box.

18. The coin handling apparatus according to claim 1, wherein the second route is further configured to guide the coin fed out from the plurality of the storage boxes together to the second container.

19. The coin handling apparatus according to claim 1, wherein when the replenishment processing of the first container is completed, the switch switches the route from the first route to the second route and the replenishment process of the second container is started.

20. The coin handling apparatus according to claim 1, wherein when the replenishment processing of the second container is completed, the switch switches the route from the second route to the first route and the replenishment process of the first container is started.

* * * * *